US012544855B2

(12) United States Patent
Kazama et al.

(10) Patent No.: US 12,544,855 B2
(45) Date of Patent: Feb. 10, 2026

(54) LASER PROCESSING DEVICE, LASER PROCESSING SYSTEM, AND LASER PROCESSING METHOD

(71) Applicant: KABUSHIKI KAISHA YASKAWA DENKI, Kitakyushu (JP)

(72) Inventors: Katsuya Kazama, Kitakyushu (JP);
Jun Yagawa, Kitakyushu (JP);
Yoshihiro Yoshida, Kitakyushu (JP);
Takuji Ishige, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 1016 days.

(21) Appl. No.: 17/680,361

(22) Filed: Feb. 25, 2022

(65) Prior Publication Data

US 2022/0266380 A1 Aug. 25, 2022

(30) Foreign Application Priority Data

Feb. 25, 2021 (JP) ................. 2021-028677

(51) Int. Cl.
*B23K 26/042* (2014.01)
*B23K 26/03* (2006.01)
*B23K 26/06* (2014.01)
*B23K 26/064* (2014.01)

(52) U.S. Cl.
CPC .......... *B23K 26/042* (2015.10); *B23K 26/032* (2013.01); *B23K 26/034* (2013.01); *B23K 26/0643* (2013.01)

(58) Field of Classification Search
CPC .............. B23K 26/0643; B23K 26/707; B23K 26/706; B23K 26/0884; B23K 26/703
See application file for complete search history.

(56) References Cited

U.S. PATENT DOCUMENTS

| | | | |
|---|---|---|---|
| 2010/0067981 A1 | 3/2010 | Geyer | |
| 2010/0135356 A1* | 6/2010 | Schulz | G02B 7/008 374/161 |
| 2010/0206854 A1* | 8/2010 | Nakai | B23K 1/0056 219/121.6 |
| 2016/0297032 A1* | 10/2016 | Yoshida | B23K 26/083 |

(Continued)

FOREIGN PATENT DOCUMENTS

| | | | |
|---|---|---|---|
| CN | 107052571 A | | 8/2017 |
| CN | 207155027 U | * | 3/2018 |
| CN | 109530924 A | | 3/2019 |

(Continued)

OTHER PUBLICATIONS

Office Action issued Apr. 28, 2022, in corresponding Japanese Patent Application No. 2021-028677 (with English Translation), 15 pages.

(Continued)

*Primary Examiner* — Thien S Tran
(74) *Attorney, Agent, or Firm* — Oblon, McClelland, Maier & Neustadt, L.L.P.

(57) ABSTRACT

A laser processing system includes an irradiation device that irradiates a laser beam to a workpiece and includes a housing, a box positioned inside the housing and housing at least a part of a path of the laser beam, and at least one infrared sensor positioned inside the housing and around the box.

20 Claims, 14 Drawing Sheets

(56) References Cited

U.S. PATENT DOCUMENTS

2020/0387131 A1* 12/2020 Takigawa ............... G06N 20/00

FOREIGN PATENT DOCUMENTS

| | | | |
|---|---|---|---|
| CN | 110394546 A | * | 11/2019 |
| CN | 111299879 B | | 10/2020 |
| CN | 112570909 A | * | 3/2021 |
| DE | 20 2005 021 038 U1 | | 1/2007 |
| EP | 2 054 197 B1 | | 7/2010 |
| JP | 62-10985 U | | 1/1987 |
| JP | 8-229692 A | | 9/1996 |
| JP | 2002-239758 A | | 8/2002 |
| JP | 2010260093 A | * | 11/2010 |
| JP | 2011-240361 A | | 12/2011 |
| JP | 2012-024808 A | | 2/2012 |
| JP | 2020-6437 A | | 1/2020 |
| JP | 2020199517 A | * | 12/2020 ......... G05B 19/4065 |

OTHER PUBLICATIONS

Partial European Search Report issued on Jul. 29, 2022 in European Patent Application No. 22154737.5, 14 pages.
Extended European Search Report issued Nov. 22, 2022, in corresponding European Patent Application No. 22154737.5, 68 pages.
Combined Chinese Office Action and Search Report issued Jun. 27, 2023, in corresponding Chinese Patent Application No. 202210017106.7 (with English Translation), 23 pages.
Office Action issued on Aug. 22, 2025, in related European application No. 22 154 737.5 (7pages).

* cited by examiner

FIG. 12

LASER PROCESSING DEVICE, LASER PROCESSING SYSTEM, AND LASER PROCESSING METHOD

CROSS-REFERENCE TO RELATED APPLICATIONS

The present application is based upon and claims the benefit of priority to Japanese Patent Application No. 2021-028677, filed Feb. 25, 2021, the entire contents of which are incorporated herein by reference.

BACKGROUND OF THE INVENTION

Field of the Invention

An embodiment disclosed herein relates to a laser processing device, a laser processing system, and a laser processing method.

Description of Background Art

In Japanese Patent Application Laid-Open Publication No. 2012-024808, a scanning type laser processing device is described. In this laser processing device, a temperature-sensing element is provided near a mirror holder that holds a galvano mirror. The entire contents of this publication are incorporated herein by reference.

SUMMARY OF THE INVENTION

According to one aspect of the present invention, a laser processing system includes an irradiation device that irradiates a laser beam to a workpiece and includes a housing, a box positioned inside the housing and housing at least a part of a path of the laser beam, and at least one infrared sensor positioned inside the housing and around the box.

According to another aspect of the present invention, a laser processing method for processing a workpiece includes irradiating a laser beam to workpiece by an irradiation device including a housing, a box positioned inside the housing and housing at least a part of a path of the laser beam, and at least one infrared sensor positioned inside the housing and around the box, determining whether or not the at least one infrared sensor of the irradiation device has detected first infrared light of a specific wavelength, and stopping the irradiation of the laser beam by the irradiation device when it is determined that the first infrared light has been detected.

According to yet another aspect of the present invention, a non-transitory computer readable medium has stored thereon a program that when executed by a computer causes the computer to implement a laser processing method for processing a workpiece, and the laser processing method includes irradiating a laser beam to workpiece by an irradiation device including a housing, a box positioned inside the housing and housing at least a part of a path of the laser beam, and at least one infrared sensor positioned inside the housing and around the box, determining whether or not the at least one infrared sensor has detected first infrared light of a specific wavelength, and stopping the irradiation of the laser beam when it is determined that the first infrared light has been detected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12 is a perspective view illustrating an example of a structure near a holding part of a Y-axis mirror with a part of the mirror housing illustrated as a cross section;

DETAILED DESCRIPTION OF THE EMBODIMENTS

Figure 1:
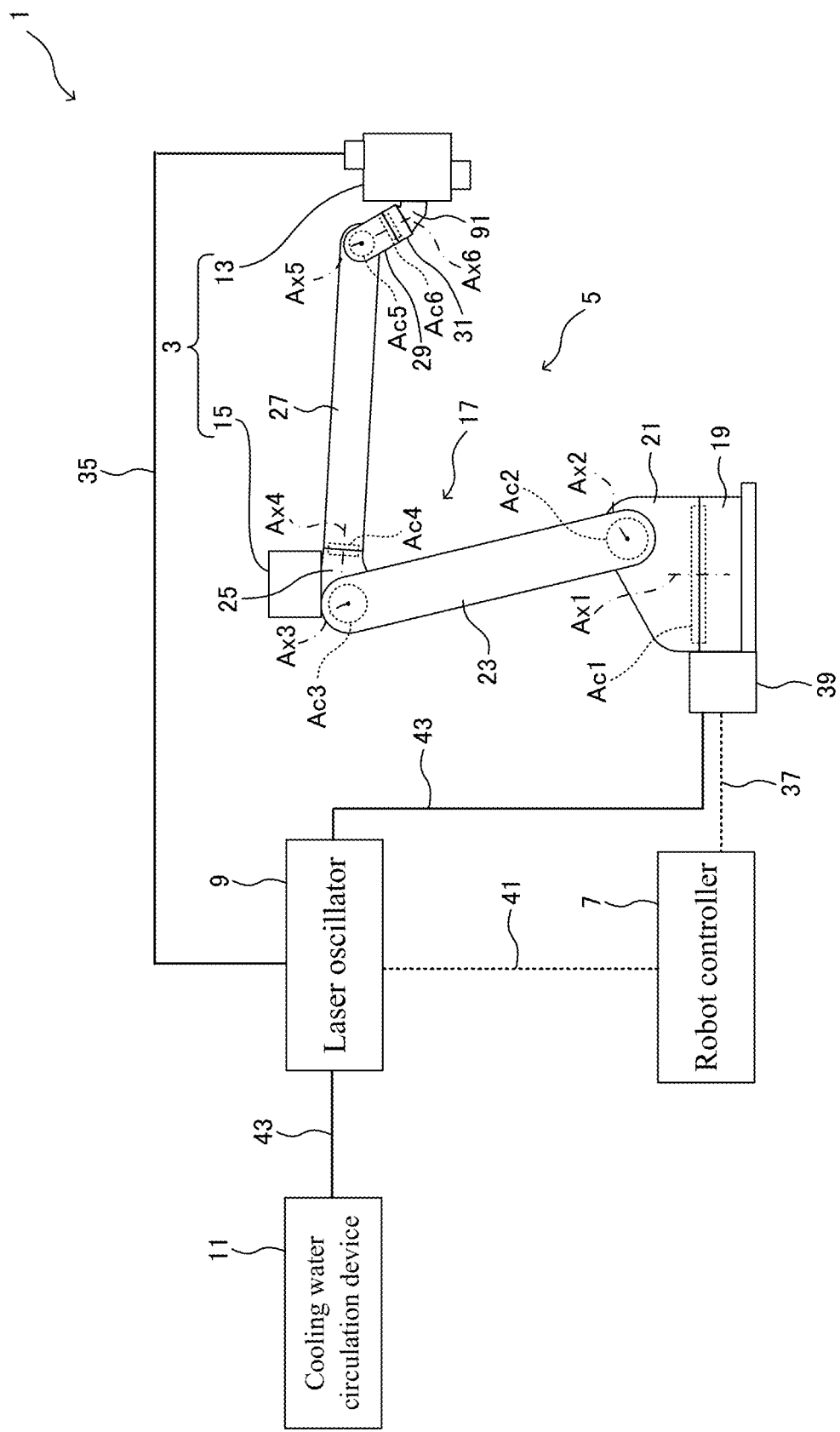
FIG. 1 is a system structural diagram illustrating an example of an overall structure of a laser processing system.

Embodiments will now be described with reference to the accompanying drawings, wherein like reference numerals designate corresponding or identical elements throughout the various drawings.

1. Overall Structure of Laser Processing System

An example of an overall structure of a laser processing system 1 according to the present embodiment is described with reference to FIG. 1. FIG. 1 is a system structural diagram illustrating the example of the overall structure of the laser processing system 1.

As illustrated in FIG. 1, the laser processing system 1 includes a laser processing device 3, a robot 5, a robot controller 7, a laser oscillator 9, and a cooling water circulation device 11. The laser processing device 3 includes an irradiation device 13 and an irradiation control device 15.

The laser processing device 3 performs laser processing by irradiating a laser beam to a workpiece. Laser processing is, for example, laser welding or marking processing. Processing using a laser beam other than these may also be performed. The laser processing device 3 is mounted in the robot 5.

The robot 5 (an example of an automatic machine) is provided with an arm part 17, and is, for example, structured as a vertical articulated 6-axis robot with 6 joints. The robot 5 performs laser processing with respect to a workpiece by moving the irradiation device 13 attached to a front end part thereof by driving the arm part 17. The robot 5 may be a robot other than a 6-axis robot (for example, a 5-axis or 7-axis robot), or may be a robot other than a vertical articulated robot such as a horizontal articulated robot. In addition to a general-purpose robot, the robot 5 may be, for example, a dedicated work machine or the like that is designed exclusively for a specific work and is provided with an actuator movable in XYZθ directions. The robot 5 may be a processing machine or a working machine.

The robot 5 has the arm part 17, a base 19, and a turning part 21. The base 19 is fixed to, for example, a floor or a pedestal. For example, the robot 5 may be mounted on a traveling vehicle traveling on a rail or may be mounted on an automatic guided vehicle (AGV) or the like so as to be movable.

The turning part 21 is supported on an upper end part of the base 19 in a manner capable of turning around a rotation axis (Ax1) substantially parallel to an up-down direction. The turning joint 21 is driven to turn around the rotation axis (Ax1) with respect to the upper end part of the base 19 by a drive of an actuator (Ac1) provided in a joint part between the turning part 21 and the base 19.

The arm part 17 is supported on a side part on one side of the turning part 21. The arm part 17 has a lower arm part 23, an elbow part 25, an upper arm part 27, a wrist part 29, and a flange part 31.

The lower arm part 23 is supported on a side part on one side of the turning part 21 in a manner capable of turning around a rotation axis (Ax2) substantially perpendicular to the rotation axis (Ax1). The lower arm part 23 is driven to turn around the rotation axis (Ax2) with respect to the side part on the one side of the turning part 21 by a drive of an actuator (Ac2) provided in a joint part between the lower arm part 23 and the turning part 21.

The elbow part 25 is supported on a front end side of the lower arm part 23 in a manner capable of turning around a rotation axis (Ax3) substantially parallel to the rotation axis (Ax2). The elbow part 25 is driven to turn around the rotation axis (Ax3) with respect to the front end side of the lower arm part 23 by a drive of an actuator (Ac3) provided in a joint part between the elbow part 25 and the lower arm part 23.

The upper arm part 27 is supported on a front end side of the elbow part 25 in a manner capable of rotating around a rotation axis (Ax4) substantially perpendicular to the rotation axis (Ax3). The upper arm part 27 is driven to rotate around the rotation axis (Ax4) with respect to the front end side of the elbow part 25 by a drive of an actuator (Ac4) provided in a joint part between the upper arm part 27 and the elbow part 25.

The wrist part 29 is supported on a front end side of the upper arm part 27 in a manner capable of turning around a rotation axis (Ax5) substantially perpendicular to the rotation axis (Ax4). The wrist part 29 is driven to turn around the rotation axis (Ax5) with respect to the front end side of the upper arm part 27 by a drive of an actuator (Ac5) provided in a joint part between the wrist part 29 and the upper arm part 27.

The flange part 31 is supported on a front end side of the wrist part 29 in a manner capable of rotating around a rotation axis (Ax6) substantially perpendicular to the rotation axis (Ax5). The flange part 31 is driven to rotate around the rotation axis (Ax6) with respect to the front end side of the wrist part 29 by a drive of an actuator (Ac6) provided in a joint part between the flange part 31 and the wrist part 29.

The irradiation device 13 is attached to a front end of the flange part 31 via a bracket 91. The irradiation device 13 rotates around the rotation axis (Ax6) along with the rotation around the rotation axis (Ax6) of the flange part 31. The irradiation device 13 is connected to the laser oscillator 9 by a fiber cable 35. The irradiation device 13 irradiates a laser beam oscillated from the laser oscillator 9.

The irradiation control device 15 (an example of a first control device) controls the irradiation of the laser beam by the irradiation device 13. The irradiation control device 15 is mounted, for example, on the elbow part 25 of the arm part 17. The irradiation control device 15 may be installed in a place other than the elbow part 25 of the arm part 17, or may be installed in a place other than the arm part 17 or outside the robot 5.

It is also possible that the irradiation device 13 and the irradiation control device 15 are integrally formed. However, in that case, a device attached to the front end of the robot 5 becomes larger and heavier. Therefore, in order to reduce the size of the robot 5, it is preferable to separate the irradiation device 13 and the irradiation control device 15.

The actuators (Ac1-Ac6) that respectively drive the joint parts each have a servomotor, a speed reducer, a brake, and the like (not illustrated in the drawings). In the above, for distinction, rotation around a rotation axis along a longitudinal direction (or extension direction) of the arm part 17 is called "rotation," and rotation around a rotation axis substantially perpendicular to the longitudinal direction (or extension direction) of the arm part 17 is called "turning."

The robot controller 7 (an example of a second control device) controls the robot 5. The robot controller 7 includes, for example, a computer that has an arithmetic device (CPU), a recording device, an input device, and the like, and a power feeding part (such as a servo amplifier) that supplies drive power to the robot 5. In addition to or in place of the computer, the robot controller 7 may include, for example, a motion controller, a programmable logic controller (PLC), or the like. The robot controller 7 controls an operation of the arm part 17 by controlling the drives of the actuators (Ac1-Ac6) and the like provided in the arm part 17. The robot controller 7 and a connector case 39 installed on, for example, the base 19 of the robot 5 are connected by various cables and signal lines (abbreviated by a reference numeral 37 in the illustration of FIG. 1). The robot controller 7 and the irradiation control device 15 are connected by cables, signal lines, or the like (not illustrated in the drawings) positioned inside or outside the robot 5. The irradiation control device 15 and the irradiation device 13 are also connected by cables, signal lines, or the like (not illustrated in the drawings) positioned inside or outside the robot 5.

The robot controller 7 may be integrally positioned with the robot 5 or may be separately positioned. Further, in the robot controller 7, the computer and the power feeding part described above may be separated from each other. In this case, the power feeding part may be attached to the robot 5.

The laser oscillator 9 oscillates a laser beam and outputs the laser beam to the irradiation device 13 via the fiber cable 35. The fiber cable 35 is positioned, for example, outside the robot 5. The laser oscillator 9 and the robot controller 7 are connected by various cables and signal lines (abbreviated by a reference numeral 41 in the illustration of FIG. 1).

The cooling water circulation device 11 circulates cooling water for cooling the laser oscillator 9 and the irradiation device 13. The cooling water circulation device 11 monitors a temperature of the cooling water and adjusts the temperature to a certain temperature. The cooling water circulation device 11 and the laser oscillator 9, and, the laser oscillator 9 and the connector case 39 of the robot 5 are connected by, for example, a cooling water pipe 43 such as a tube. The cooling water pipe 43 is structured to include forward and backward pipes, but in FIG. 1, it is simplified and shown as a single pipe. A cooling water pipe (not illustrated in the drawings) such as a tube positioned inside or outside the robot 5 is connected to the irradiation device 13 via the connector case 39.

Although not illustrated in FIG. 1, the laser processing system 1 may include an air or gas supply device. Air is blown onto a workpiece, for example, to suppress spatter or fume during laser welding. Gas is, for example, an inert gas such as a nitrogen gas or an argon gas, and is blown onto a workpiece, for example, to suppress carbonization during laser welding. An air or gas outlet may be positioned at a front end of the irradiation device 13.

2. Structure of Irradiation Device

Figure 2:
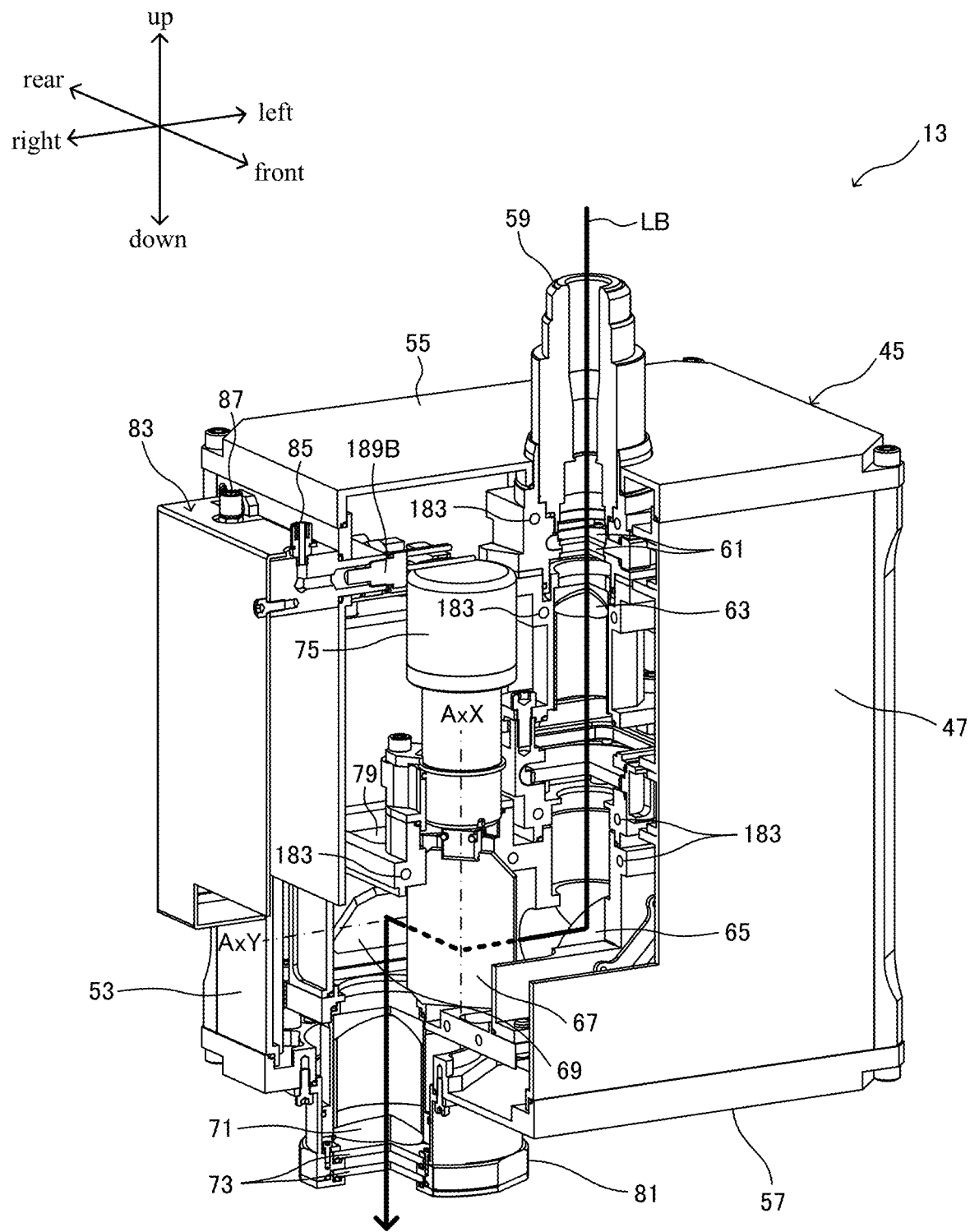
FIG. 2 is a perspective view illustrating an example of an external structure of an irradiation device viewed from an obliquely forward direction while illustrating an internal structure with a part of the irradiation device illustrated as a cross section.
Figure 3:
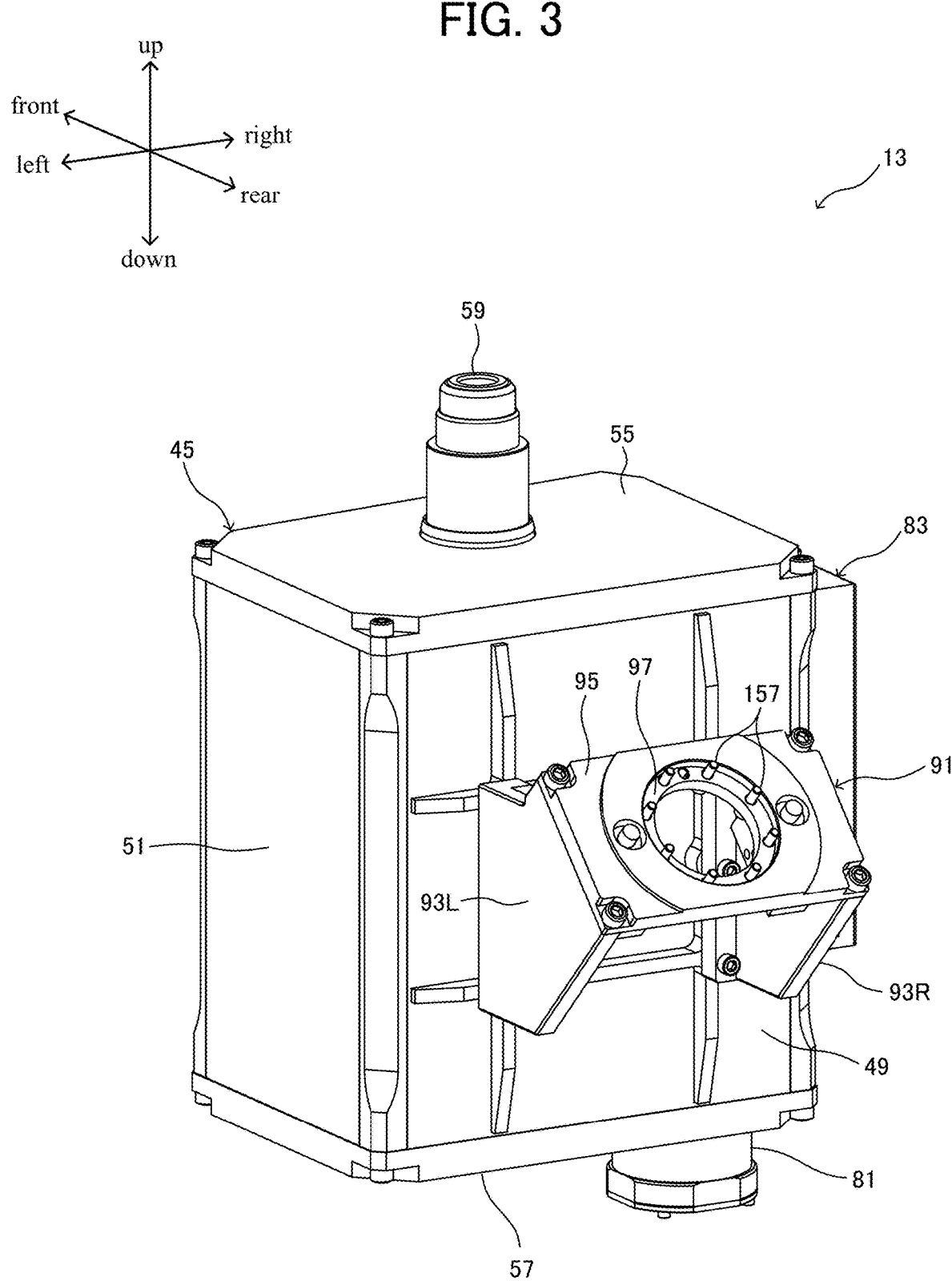
FIG. 3 is a perspective view illustrating an example of the external structure of the irradiation device viewed from an obliquely rearward direction.

An example of an internal structure and an external structure of the irradiation device 13 is described with reference to FIGS. 2 and 3. FIG. 2 is a perspective view illustrating an example of the external structure of the irradiation device 13 viewed from an obliquely forward direction while illustrating the internal structure with a part of the irradiation device 13 illustrated as a cross section. FIG. 3 is a perspective view illustrating an example of the external structure of the irradiation device 13 viewed from an obliquely rearward direction. In FIGS. 2 and 3, for convenience of description of the structure of the irradiation device 13, directions of up, down, left, right, front, rear, and the like are used as appropriate. The directions change according to a posture of the irradiation device 13, and do not limit a positional relationship between structural components of the irradiation device 13. In FIGS. 2 and 3, the up-down direction is a laser beam incident direction (downward from an upper side); the front-rear direction is a direction in which the rear side is the side where the bracket is attached and the front side is on the opposite side with respect to the bracket; and the left-right direction is direction perpendicular to both the up-down direction and the front-rear direction.

As illustrated in FIGS. 2 and 3, the irradiation device 13 has a substantially rectangular parallelepiped housing 45. The housing 45 is made of, for example, an aluminum alloy. The housing 45 has a front surface 47, a rear surface 49, a left surface 51, a right surface 53, an upper surface 55, and a lower surface 57. A connector 59 to which the fiber cable 35 is connected is provided on the upper surface 55. As illustrated in FIG. 2, inside the housing 45, in a path of a laser beam (LB) incident from the fiber cable 35 via the connector 59, protective glasses 61, a collimation lens 63, a dichroic mirror 65, an X-axis mirror 67, a Y-axis mirror 69, a condenser lens 71, and protective glasses 73 are provided.

The protective glasses 61 prevent dust or the like from entering the housing 45 from the fiber cable 35, and protect the path of the laser beam in the irradiation device 13. For example, two protective glasses 61 are provided. The collimation lens 63 adjusts a laser beam incident and diffused from the connector 59 to substantially parallel light. The dichroic mirror 65 is a mirror that reflects light of a specific wavelength and transmits light of other wavelengths. For example, the dichroic mirror 65 reflects the laser beam adjusted to parallel light by the collimation lens 63, for example, from a downward direction to a rightward direction. Further, for example, the dichroic mirror 65 allows visible light that is incident from a workpiece via the condenser lens 71 and reflected by the Y-axis mirror 69 and the X-axis mirror 67 to pass, for example, from the right side to the left side.

The X-axis mirror 67 (an example of a first mirror) reflects a laser beam reflected by the dichroic mirror 65, for example, from a rightward direction to a rearward direction. The X-axis mirror 67 is rotated around an X axis (AxX) substantially parallel to the up-down direction by an X-axis motor 75 positioned inside the housing 45. The Y-axis mirror 69 (an example of a second mirror) further reflects the laser beam reflected by the X-axis mirror 67, for example, from a rearward direction to a downward direction. The Y-axis mirror 69 is rotated around a Y axis (AxY) substantially parallel to the left-right direction by a Y-axis motor 77 (see FIG. 5) positioned inside the housing 45.

The dichroic mirror 65, the X-axis mirror 67, and the Y-axis mirror 69 are housed in a box-shaped mirror housing 79 (an example of a box) positioned inside the housing 45. The mirror housing 79 is made of, for example, a stainless alloy (such as SUS304) and houses at least a part of the path of the laser beam.

The condenser lens 71 condenses a laser beam of parallel light reflected by the Y-axis mirror 69. The protective glasses 73 prevent, for example, spatter, fume, or the like from entering the housing 45 from a workpiece, and protect the path of the laser beam inside the irradiation device 13. For example, two protective glasses 73 are provided. The condenser lens 71 and the protective glasses 73 are installed inside an irradiation port 81 provided protruding downward from the lower surface 57 of the housing 45.

As illustrated in FIG. 2, a cooling water head 83 is provided on the right surface 53 of the housing 45. The cooling water head 83 has, for example, an inflow port 85 and an outflow port 87 on an upper surface thereof. The cooling water supplied from the cooling water circulation device 11 flows into the housing 45 through the inflow port 85. The cooling water flows through a hole water channel 183 or a tube water channel 181 (see FIG. 9) formed in the mirror housing 79 or in other components forming the path of the laser beam, and cools around the path of the laser beam inside the housing 45. The cooling water flows out of the housing 45 through the outflow port 87.

As illustrated in FIG. 3, the bracket 91 for attaching to the robot 5 is provided on the rear surface 49 of the housing 45. The bracket 91 (an example of an attachment member) includes a pair of side plates (93L, 93R) positioned opposing each other in the left-right direction, and an attachment plate 95 fixed obliquely upward to rear side front ends of the side plates (93L, 93R). The attachment plate 95 is provided with an annular recess 97 into which the flange part 31 of the robot 5 is fitted.

Although not illustrated in FIGS. 2 and 3, on the upper surface 55 of the housing 45, for example, connectors for connecting signal lines and cables, and, for example, a CCD camera or the like for imaging the above-described visible light that is incident from a workpiece and passes through the dichroic mirror 65 may be installed.

Further, in the above, the structure in which the irradiation device 13 drives a laser beam on the two axes, the X axis and the Y axis, is described as an example. However, the present invention is not limited to this. For example, it is also possible to have a structure in which, by providing a third axis (Z axis) that drives a lens in an optical axis direction in addition to the X axis and the Y axis, the irradiation device 13 drives a laser beam on three axes.

Figure 4:
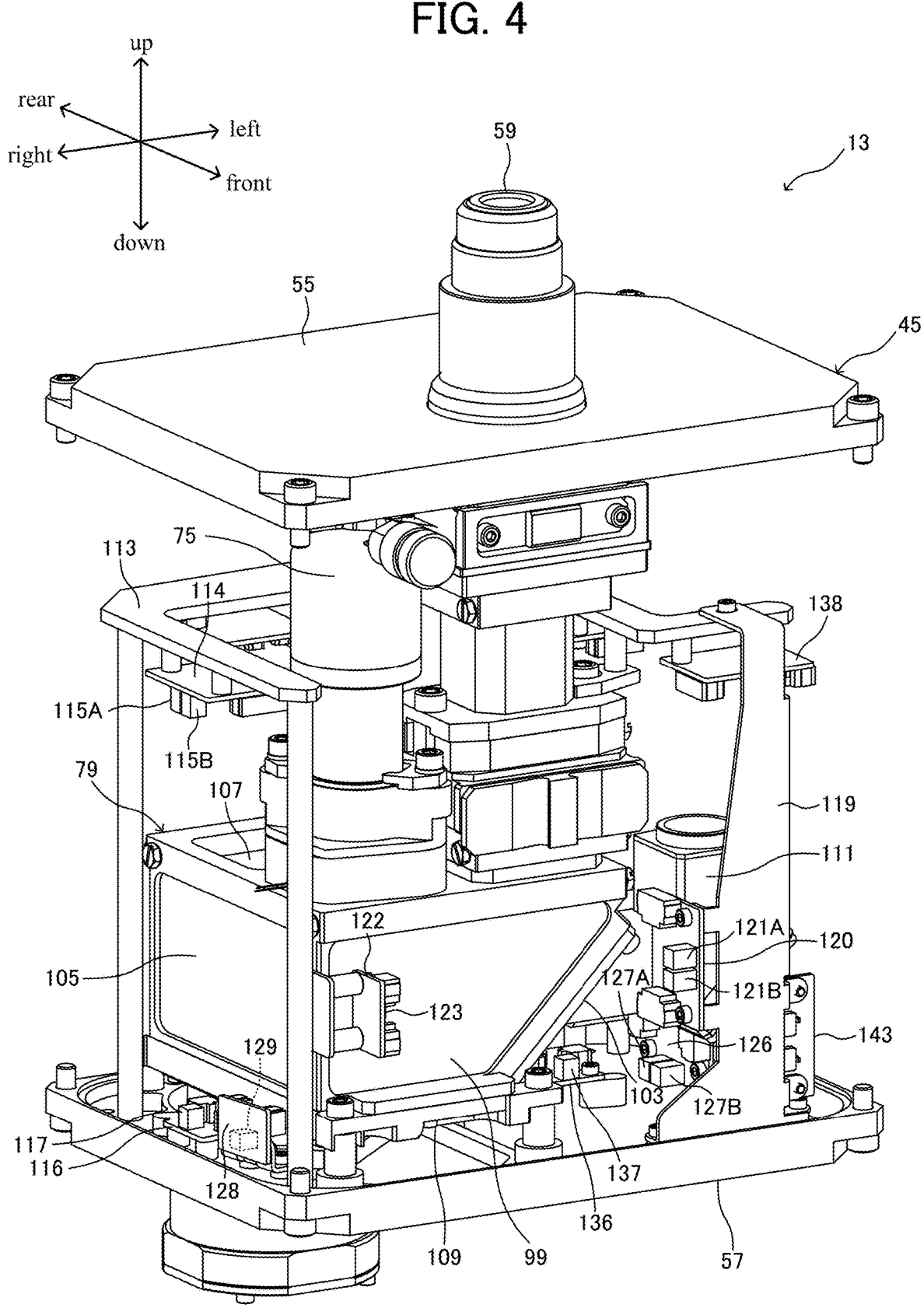
FIG. 4 is a perspective view of an example of the internal structure of the irradiation device, in a state in which a front surface, a rear surface, a left surface, a right surface, and the like of a housing of the irradiation device are removed, as viewed from an obliquely forward direction.
Figure 5:
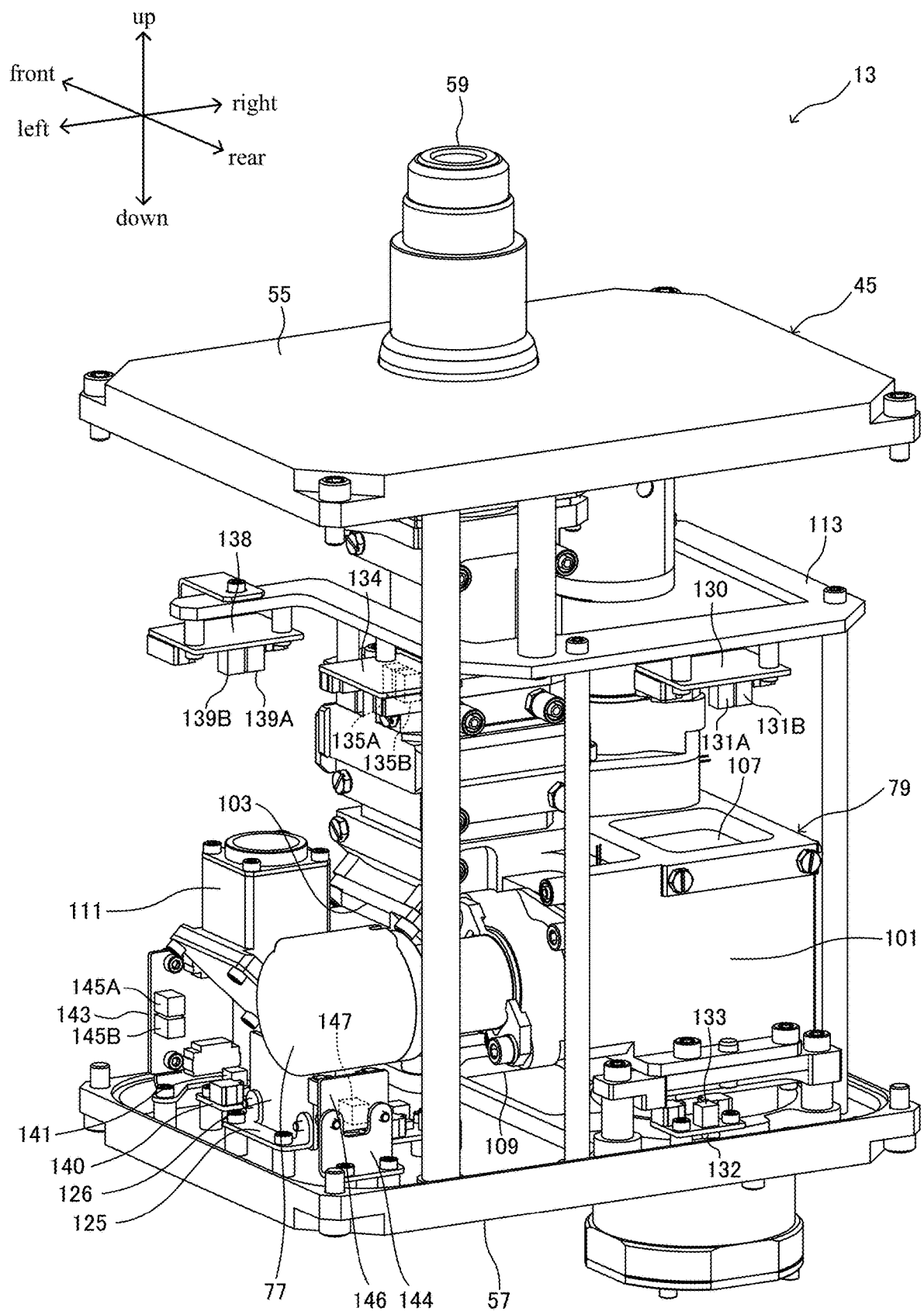
FIG. 5 is a perspective view of an example of the internal structure of the irradiation device, in a state in which the front surface, the rear surface, the left surface, the right surface, and the like of the housing are removed, as viewed from an obliquely rearward direction.

3. Positioning Structure of Infrared Sensors and Infrared Light Emitting Devices An example of a positioning structure of infrared sensors and infrared light emitting devices is described with reference to FIGS. 4 and 5. FIG. 4 is a perspective view of an example of an internal structure of the irradiation device 13, in a state in which the front surface 47, the rear surface 49, the left surface 51, the right surface 53, and the like of the housing 45 are removed, as viewed from an obliquely forward direction. FIG. 5 is a perspective view of an example of the internal structure of the irradiation device 13, in a state in which the front surface 47, the rear surface 49, the left surface 51, the right surface 53, and the like of the housing 45 are removed, as viewed from an obliquely rearward direction. The directions illustrated in FIGS. 4 and 5 correspond to the directions illustrated in FIGS. 2 and 3.

As illustrated in FIGS. 4 and 5, inside the housing 45, multiple infrared sensors and multiple infrared light emitting devices are positioned around the mirror housing 79. The mirror housing 79 is a box having a substantially rectangular parallelepiped shape. The mirror housing 79 has a front wall part 99, a rear wall part 101, a left wall part 103, a right wall part 105, an upper wall part 107, and a lower wall part 109. As illustrated in FIG. 4, the left wall part 103 has a portion inclined with respect to the up-down direction. On the front side of the left wall part 103, a reflection tube part 111 that protrudes to the left side and bends upward is provided. The reflection tube part 111 reflects the above-described visible light that is incident from a workpiece and passes through the dichroic mirror 65, for example, from the leftward direction to the upward direction by a mirror (not illustrated in the drawings) installed therein. Although not illustrated in FIGS. 4 and 5, the CCD camera installed on the upper surface 55 of the housing 45 may capture an image of the visible light and transmit the image to the irradiation control device 15. As a result, by image processing, for example, a processing status such as the quality of laser welding can be monitored. As illustrated in FIG. 5, on the rear side of the left wall part 103, the Y-axis motor 77 is provided protruding to the left side.

The multiple infrared sensors are respectively positioned corresponding to the multiple wall parts forming the mirror housing 79. As illustrated in FIG. 4, for example, in an upper part of the right wall part 105 of the mirror housing 79, a pair of infrared sensors (115A, 115B) are installed via a substrate 114 supported by a support member 113. The infrared sensors (115A, 115B) are, for example, photodiodes, but other types of sensors may also be used as long as they can detect infrared light. The infrared sensors (115A, 115B) each have a detection area that expands, for example, into a conical shape, and, with the infrared sensors, it is possible to monitor a range that includes the entire right wall part 105, a portion of the upper wall part 107, and the like.

In a lower part of the right wall part 105, an infrared light emitting device 117 is installed via a substrate 116 so as to oppose the infrared sensors (115A, 115B) in the up-down direction. The infrared light emitting device 117 is, for example, an LED, but other types of light emitting devices may be used as long as they can emit infrared light. The infrared light emitting device 117 emits infrared light for failure diagnosis toward the infrared sensors (115A, 115B) at a predetermined time interval. The predetermined time interval is, for example, about 1 second. As a result, failure diagnosis of the infrared sensors (115A, 115B) can be performed at all times.

Further, for example, on the left side of the front wall part 99 of the mirror housing 79, a pair of infrared sensors (121A, 121B) are installed via a substrate 120 supported by a support member 119. The infrared sensors (121A, 121B) each have a detection area that expands, for example, into a conical shape, and, with the infrared sensors, it is possible to monitor a range that includes the entire front wall part 99 and the like.

On the right side of the front wall part 99, an infrared light emitting device 123 is installed via a substrate 122 so as to oppose the infrared sensor (121A, 121B) in the left-right direction. The infrared light emitting device 123 emits infrared light for failure diagnosis toward the infrared sensors (121A, 121B) at a predetermined time interval. As a result, failure diagnosis of the infrared sensors (121A, 121B) can be performed at all times.

Further, for example, on the left side of the lower wall part 109 of the mirror housing 79, a pair of infrared sensors (127A, 127B) are installed via a substrate 126 supported by a support member 125 (see FIG. 5). The infrared sensors (127A, 127B) each have a detection area that expands, for example, into a conical shape, and, with the infrared sensors, it is possible to monitor a range that includes the entire lower wall part 109 and the like.

On the right side of the lower wall part 109, an infrared light emitting device 129 is installed via a substrate 128 so as to oppose the infrared sensor (127A, 127B) in the left-right direction. The infrared light emitting device 129 emits infrared light for failure diagnosis toward the infrared sensors (127A, 127B) at a predetermined time interval. As a result, failure diagnosis of the infrared sensors (127A, 127B) can be performed at all times.

As illustrated in FIG. 5, for example, on the upper side of the rear wall part 101 of the mirror housing 79, a pair of infrared sensors (131A, 131B) are installed via a substrate 130 supported by the support member 113. The infrared sensors (131A, 131B) each have a detection area that expands, for example, into a conical shape, and, with the infrared sensors, it is possible to monitor a range that includes the entire rear wall part 101, a portion of the upper wall part 107, and the like.

On the lower side of the rear wall part 101, an infrared light emitting device 133 is installed via a substrate 132 so as to oppose the infrared sensors (131A, 131B) in the up-down direction. The infrared light emitting device 133 emits infrared light for failure diagnosis toward the infrared sensors (131A, 131B) at a predetermined time interval. As a result, failure diagnosis of the infrared sensors (131A, 131B) can be performed at all times.

As illustrated in FIG. 5, for example, on the upper side of the left wall part 103 of the mirror housing 79, a pair of infrared sensors (135A, 135B) are installed via a substrate 134 supported by the support member 113. The infrared sensors (135A, 135B) each have a detection area that expands, for example, into a conical shape, and, with the infrared sensors, it is possible to monitor a range that includes the entire left wall part 103, an area around the reflection tube part, and the like.

As illustrated in FIG. 4, for example, on the lower side of the left wall part 103, an infrared light emitting device 137 is installed via a substrate 136 so as to oppose the infrared sensors (135A, 135B) in the up-down direction. The infrared light emitting device 137 emits infrared light for failure diagnosis toward the infrared sensors (135A, 135B) at a predetermined time interval. As a result, failure diagnosis of the infrared sensors (135A, 135B) can be performed at all times.

As illustrated in FIG. 5, for example, on the upper side of the reflection tube part 111, a pair of infrared sensors (139A, 139B) are installed via a substrate 138 supported by the support member 113. The infrared sensors (139A, 139B) each have a detection area that expands, for example, into a conical shape, and, with the infrared sensors, it is possible to monitor a range that includes an area around the reflection tube part 111 and the like.

On the lower side of the reflection tube part 111, an infrared light emitting device 141 is installed via a substrate 140 so as to oppose the infrared sensors (139A, 139B) in the up-down direction. The infrared light emitting device 141 emits infrared light for failure diagnosis toward the infrared sensors (139A, 139B) at a predetermined time interval. As a result, failure diagnosis of the infrared sensors (139A, 139B) can be performed at all times.

Further, for example, on the front side of the reflection tube part 111, a pair of infrared sensors (145A, 145B) are installed via a substrate 143. The infrared sensors (145A, 145B) each have a detection area that expands, for example, into a conical shape, and, with the infrared sensors, it is possible to monitor a range that includes an area around the reflection tube part 111 and the Y-axis motor 77, and the like.

On the rear side of the Y-axis motor 77, an infrared light emitting device 147 is installed via a substrate 146 supported by a support member 144 so as to oppose the infrared sensors (145A, 145B) in the front-rear direction. The infrared light emitting device 147 emits infrared light for failure diagnosis toward the infrared sensors (145A, 145B) at a predetermined time interval. As a result, failure diagnosis of the infrared sensors (145A, 145B) can be performed at all times.

For example, the above 7 pairs of infrared sensors (115A, 115B, 121A, 121B, 127A, 127B, 131A, 131B, 135A, 135B, 139A, 139B, 145A, 145B) (hereinafter may be referred to as "the infrared sensors 115 and the like" as appropriate) transmit detection signals to the irradiation control device 15. A first determination part 211 of the irradiation control device 15 (see FIG. 13) determines whether or not at least one infrared sensor has detected infrared light of a specific wavelength. The specific wavelength is set according to a material of the mirror housing 79 and a temperature to be detected. When the first determination part 211 determines that infrared light of a specific wavelength has been detected, an irradiation stopping part 219 (see FIG. 13) of the irradiation control device 15 immediately stops the irradiation of the laser beam by the irradiation device 13. In this way, there is a relationship between a temperature of a wall part of the mirror housing 79 and a wavelength of emitted infrared light. Therefore, by determining whether or not infrared light of a specific wavelength has been detected, it is possible to detect whether or not the temperature of the wall part has reached a specific temperature. Therefore, by identifying a wavelength corresponding to a temperature before melting according to the material (for example, SUS304) of the mirror housing 79, the irradiation of the laser beam can be stopped before the mirror housing 79 is melted.

Further, for example, infrared detection signals for failure diagnosis emitted at predetermined time intervals from the 7 infrared light emitting devices (117, 123, 129, 133, 137, 141, 147) (hereinafter may be referred to as "the infrared light emitting device 117 and the like" as appropriate), which are respectively positioned opposing the infrared sensors 115 and the like, are transmitted to the irradiation control device 15. A second determination part 213 (see FIG. 13) of the irradiation control device 15 determines whether or not a detection abnormality of infrared light for failure diagnosis has occurred in at least one infrared sensor. The detection abnormality is, for example, a case or the like where a detection signal is not received or is missing. When the second determination part 213 determines that a detection abnormality of infrared light for failure diagnosis has occurred, the irradiation stopping part 219 (see FIG. 13) of the irradiation control device 15 immediately stops the irradiation of the laser beam. As a result, failure diagnosis of the infrared sensors can be performed at all times. Further, since the irradiation of the laser beam is stopped when an abnormality or failure occurs in at least one of the infrared sensors, safety performance can be improved.

In the above, the infrared sensors 115 and the like are provided such that each of the infrared sensor sets includes two infrared sensors, and thereby, double assurance is achieved and reliability is improved. However, it is also possible that the infrared sensors are provided such that each of the infrared sensor sets includes one infrared sensor.

4. Structures of Bracket and Fall-Off Sensors

Figure 6:
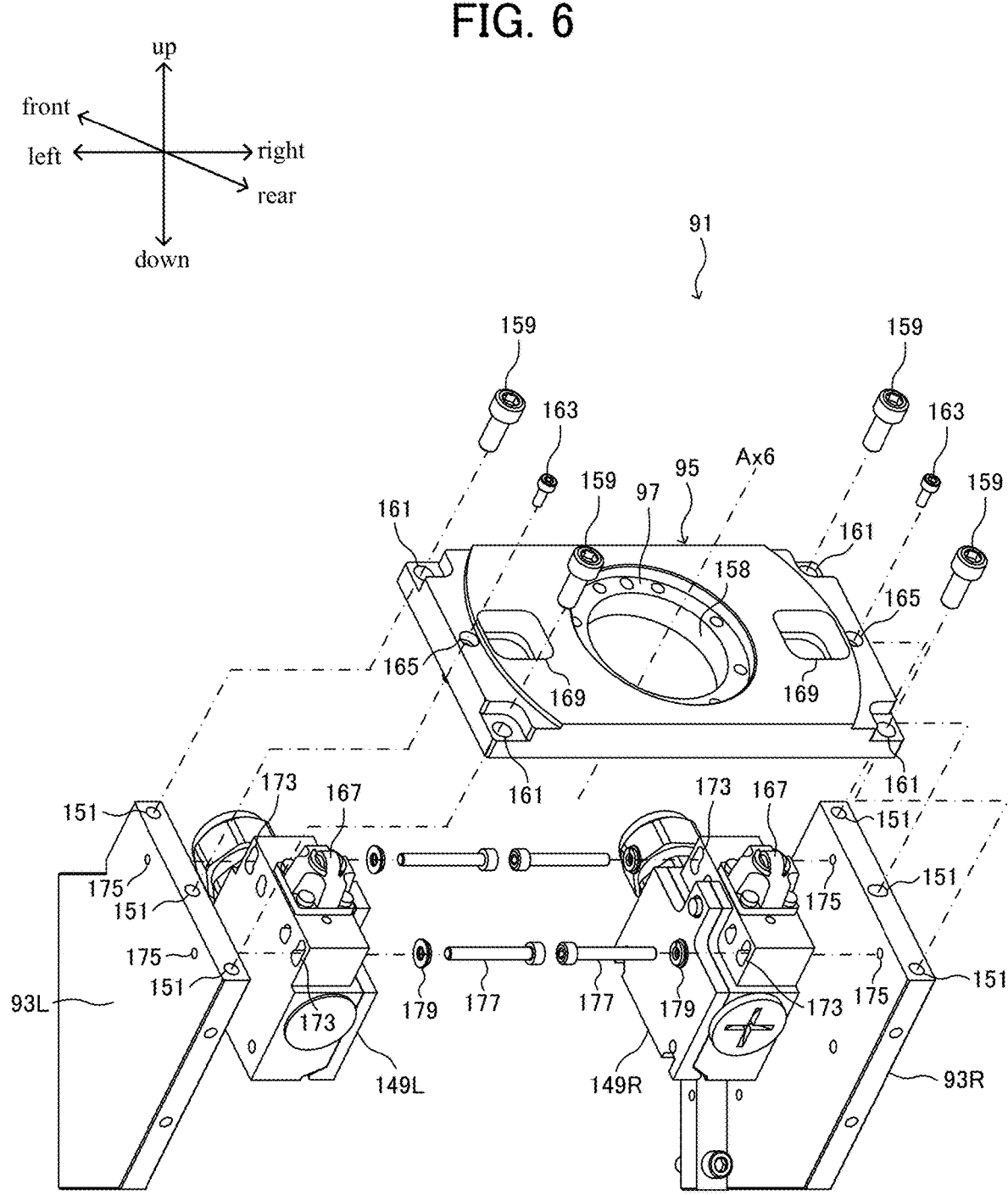
FIG. 6 is an exploded perspective view illustrating an example of a state in which a bracket is disassembled.
Figure 7:
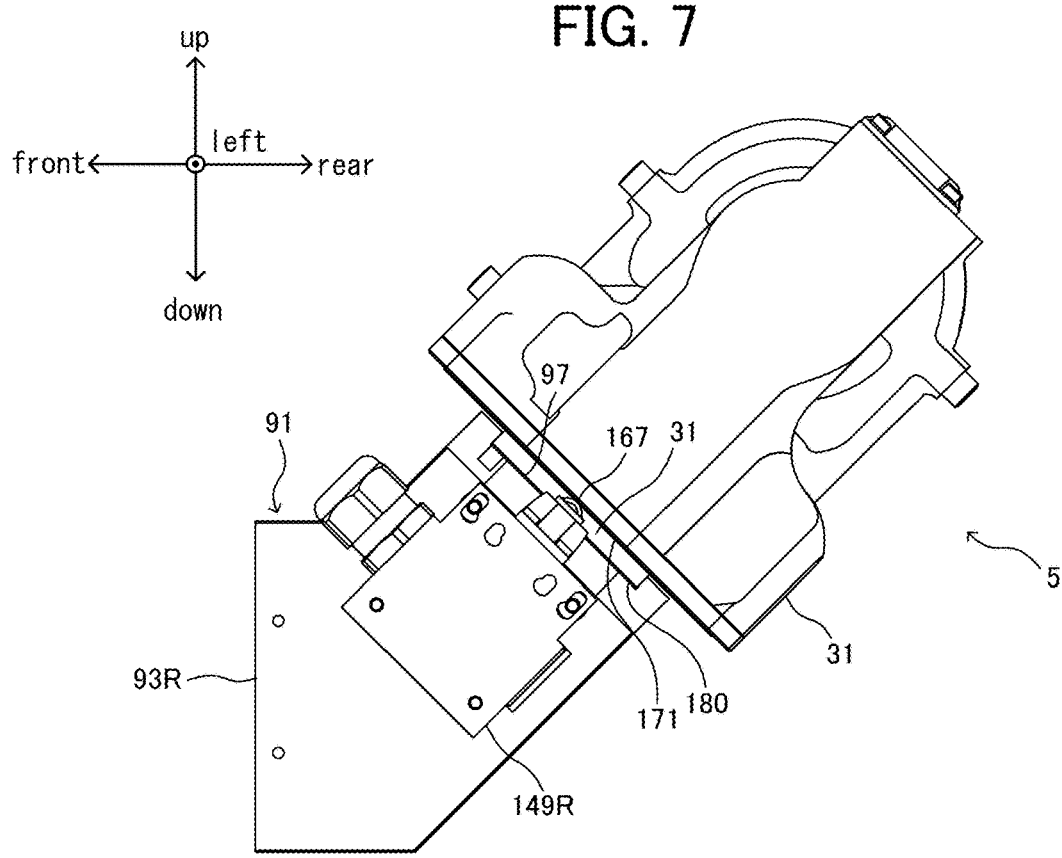
FIG. 7 is a side view of an example of a state of fall-off sensors when the bracket has not fallen off, as viewed from a leftward direction.
Figure 8:
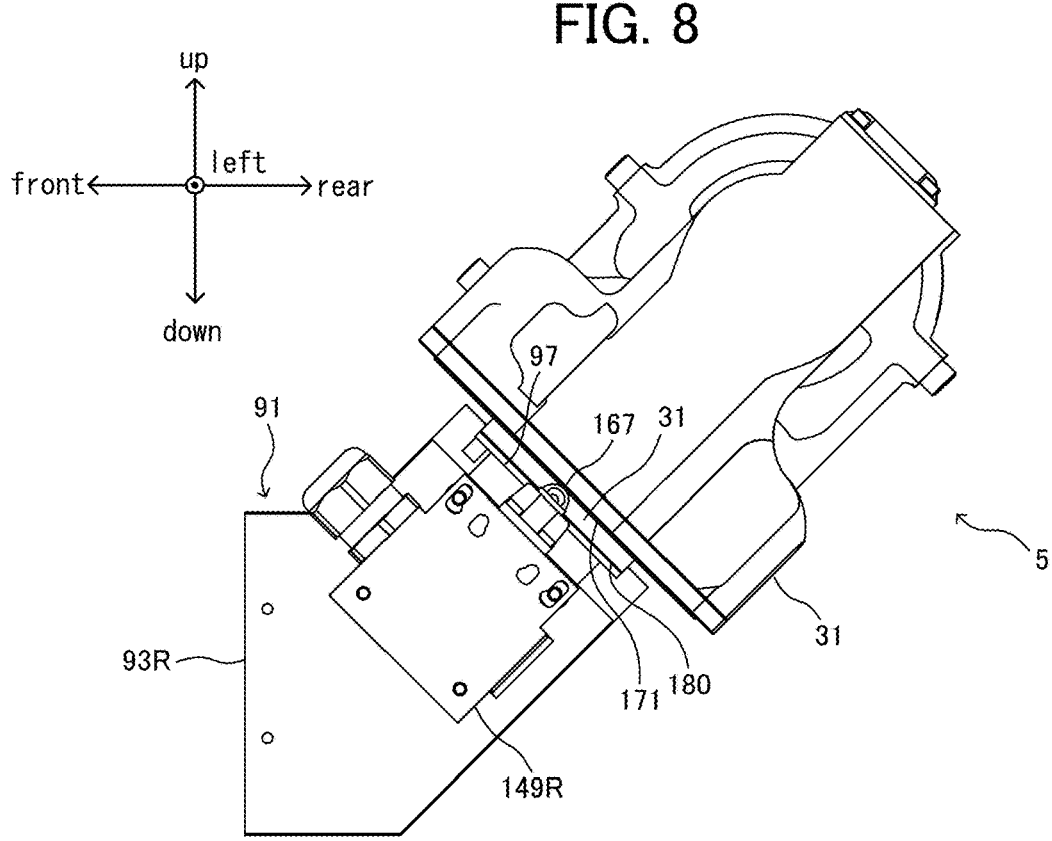
FIG. 8 is a side view of an example of a state of the fall-off sensors when the bracket has fallen off, as viewed from the leftward direction.

An example of structures of the bracket and fall-off sensors is described with reference to FIGS. 6-8. FIG. 6 is an exploded perspective view illustrating an example of a state in which the bracket 91 is disassembled. FIG. 7 is a side view of an example of a state of the fall-off sensors when the bracket 91 has not fallen off, as viewed from the leftward direction. FIG. 8 is a side view of an example of a state of the fall-off sensors when the bracket 91 has fallen off, as viewed from the leftward direction. The directions illustrated in FIGS. 6-8 correspond to the directions illustrated in FIGS. 2 and 3 and the like.

As illustrated in FIG. 6, the bracket 91 includes the side plates (93L, 93R), the attachment plate 95, and a pair of fall-off sensors (149L, 149R). The side plates (93L, 93R) are plate-like members having substantially symmetrical shapes in the left-right direction, and are positioned opposing each other in the left-right direction. The side plates (93L, 93R) each have a shape that extends rearward from the rear surface 49 of the irradiation device 13 and a front end part thereof bends obliquely upward and extends. For example, three screw holes 151 are formed on the front end part on the rear side of each of the side plates (93L, 93R).

The attachment plate 95 is, for example, a rectangular plate-like member that is long in the left-right direction. At a center part of the attachment plate 95, the annular recess 97 centered on the rotation axis (Ax6), which is the rotation axis of the flange part 31 of the robot 5, is formed. The flange part 31 of the robot 5 is fitted into the recess 97 and fixed thereto by multiple bolts 157 (see FIG. 3). A through hole 158 for inserting cables, signal lines, or the like is formed at the center of the recess 97. Through holes 161 for inserting relatively large bolts 159 are respectively formed at four corners of the attachment plate 95. Through holes 165 for inserting relatively small bolts 163 are respectively formed at substantially center portions on both ends in the left-right direction of the attachment plate 95. The four bolts 159 and the two bolts 163 are inserted into the through holes (161, 165) of the attachment plate 95 and are screwed into the screw holes 151 of the side plates (93L, 93R), respectively. As a result, the attachment plate 95 is fixed to the side plates (93L, 93R).

The pair of fall-off sensors (149L, 149R) are respectively fixed to inner sides of the side plates (93L, 93R). The fall-off sensors (149L, 149R) have substantially symmetrical shapes in the left-right direction. The fall-off sensors (149L, 149R) detect presence or absence of falling off of the bracket 91 from the robot 5. The fall-off sensors (149L, 149R) are respectively positioned on one side and the other side in the left-right direction of the rotation axis (Ax6), which is the rotation axis of the flange part 31 of the robot 5. The fall-off sensors (149L, 149R) are, for example, plunger type limit switches. The fall-off sensors (149L, 149R) respectively have plungers 167 that can move forward and backward with respect to the side (rear upper side) where the attachment plate 95 is positioned. The plungers 167 are respectively in contact with contact parts 171 (see FIGS. 7 and 8) provided on the left and right sides of the flange part 31 of the robot 5 through detection holes 169 formed on the left and right sides of the recess 97 of the attachment plate 95. As long as falling off or detachment of the flange part 31 from the recess 97 can be detected, limit switches other than plunger type limit switches, or other types of sensors, may be used.

The fall-off sensors (149L, 149R) are each formed with, for example, two through holes 173 for inserting bolts. On inner sides of the side plates (93L, 93R), screw holes 175 are respectively formed at positions corresponding to the four through holes 173. For example, two bolts 177 are respectively inserted through the through holes 173 of the fall-off sensor (149L) via washers 179 and screwed into the screw holes 175 of the side plate (93L). As a result, the fall-off sensor (149L) is fixed to the inner side of the side plate (93L). Similarly, for example, two bolts 177 are respectively inserted through the through holes 173 of the fall-off sensor (149R) via washers 179 and screwed into the screw holes 175 of the side plate (93R). As a result, the fall-off sensor (149R) is fixed to the inner side of the side plate (93R).

As illustrated in FIG. 7, when a front end part 180 of the flange part 31 of the robot 5 is in contact with the recess 97, the plunger 167 of the fall-off sensor (149R) is in contact with the contact part 171 of the robot 5 and is pushed in. In this case, the fall-off sensor (149R) does not output an abnormality signal. On the other hand, as illustrated in FIG. 8, for example, when there is a gap between the front end part 180 of the flange part 31 of the robot 5 and the recess 97 due to some reason such as when the bolts 157 are loosened or forgotten to be tightened, the plunger 167 of the fall-off sensor (149R) is pushed out. In this case, the fall-off sensor (149R) detects a size of the falling off (the gap between the front end part 180 of the flange part 31 and the recess 97) and outputs it to the irradiation control device 15. Further, in FIGS. 7 and 8, the operation of the fall-off sensor (149R) is described. However, the same applies to the operation of the fall-off sensor (149L). As described above, the fall-off sensors (149L, 149R) detect presence or absence of falling off of the flange part 31 of the robot 5 from the recess 97.

When the fall-off sensors (149L, 149R) detect a falling off, the fall-off sensors (149L, 149R) transmit the size of the falling off to the irradiation control device 15. A fifth determination part 218 (see FIG. 13) of the irradiation control device 15 determines whether or not the size of the falling off is within a predetermined distance. When the size of the falling off received from at least one of the pair of fall-off sensors (149L, 149R) is greater than a given distance, the irradiation stopping part 219 (see FIG. 13) of the irradiation control device 15 stops the irradiation of the laser beam. As a result, a falling off can be detected before the bracket 91 completely falls off from the flange part 31 of the robot 5, and thus, safety performance can be further improved.

5. Cooling Water Channel and Positioning Structure of Water Temperature Sensors

Figure 9:
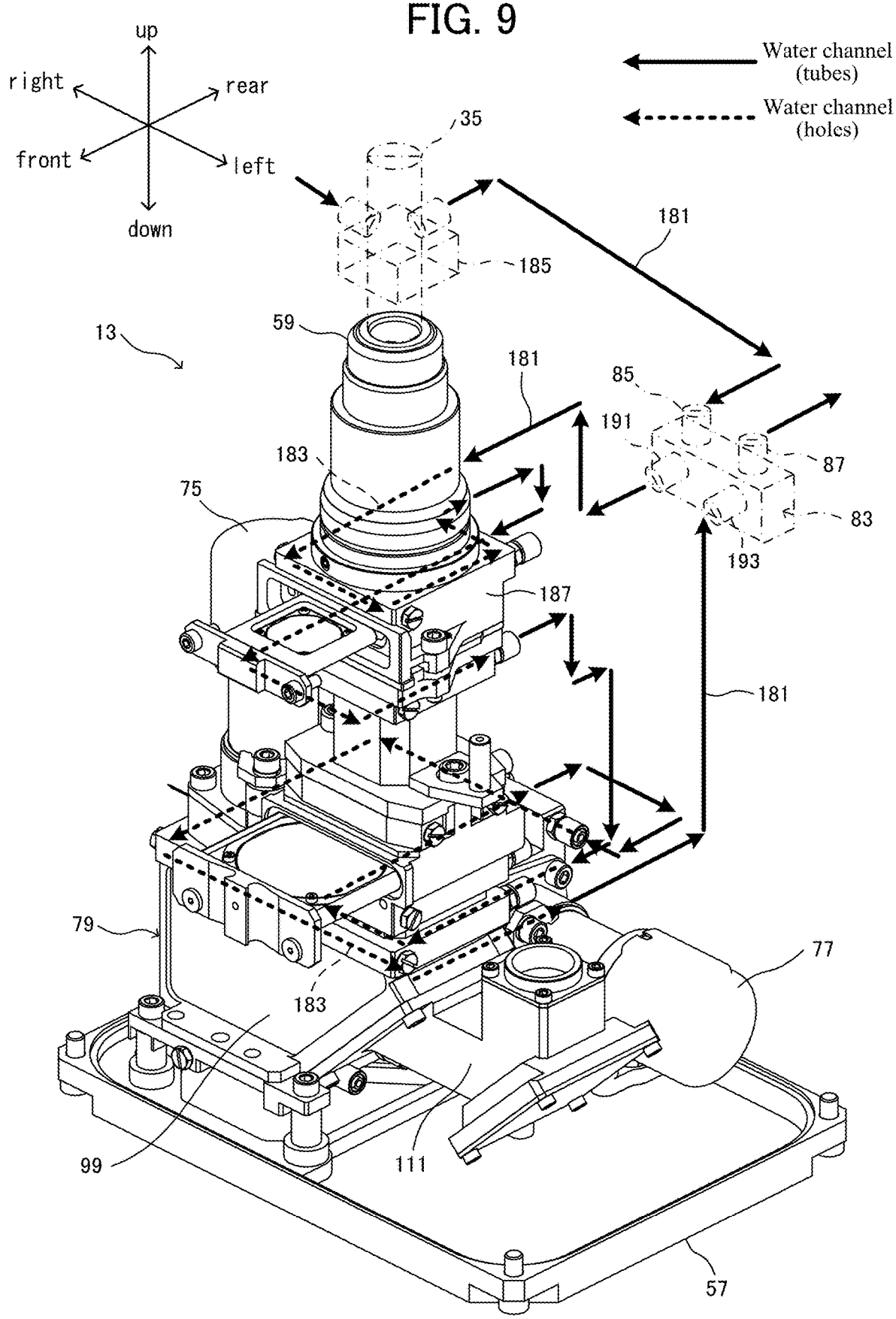
FIG. 9 is an explanatory diagram for describing an example of a flow path of cooling water in the housing of the irradiation device.
Figure 10:
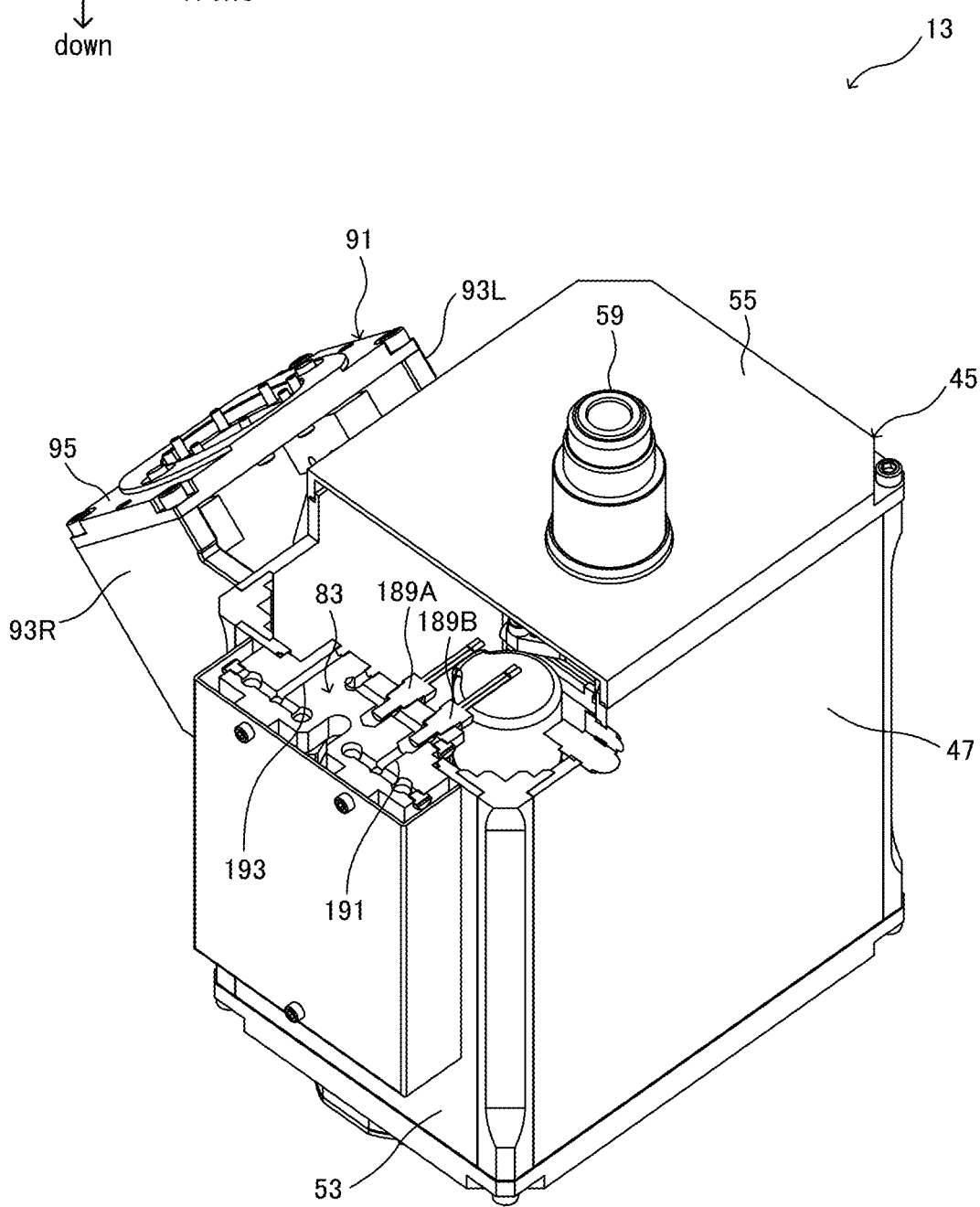
FIG. 10 is a perspective view illustrating an example of a positioning structure of water temperature sensors of the cooling water with a part of the irradiation device illustrated as a cross section.

Examples of a structure of a cooling water channel and a positioning structure of water temperature sensors are described with reference to FIGS. 9 and 10. FIG. 9 is an explanatory diagram for describing an example of a flow path of cooling water in the housing 45 of the irradiation device 13. FIG. 10 is a perspective view illustrating an example of a positioning structure of water temperature sensors of the cooling water with a part of the irradiation device 13 illustrated as a cross section. The directions illustrated in FIGS. 9 and 10 correspond to the directions illustrated in FIGS. 2 and 3 and the like.

As illustrated in FIG. 9, the irradiation device 13 has a water channel inside the housing 45 through which cooling water for cooling around the path of the laser beam flows. In FIG. 9, for example, the water channel 181 formed of pipes such as tubes is indicated using solid arrows, and, for example, the water channel 183 of holes integrally formed with the components forming the path of the laser beam is indicated using broken line arrows. The cooling water flows through a cooler 185 positioned near a front end of the fiber cable 35 on the connector 59 side to cool the fiber cable 35. After that, the cooling water passes through the water channel 181 and flows into the housing 45 through the inflow port 85 of the cooling water head 83 (simplified in the illustration). Inside the housing 45, the cooling water circulates in the water channels (181, 183) to cool components or optical instruments forming the path of the laser beam. The components to be cooled include, for example, a lens case 187 that houses the collimation lens 63 and the like, the mirror housing 79, and the like. After that, the cooling water passes through the water channel 181 and flows out of the housing 45 through the outflow port 87 of the cooling water head 83.

As illustrated in FIG. 10, the irradiation device 13 has two water temperature sensors (189A, 189B) inside the housing 45. The water temperature sensors (189A, 189B) (an example of a first temperature sensor) are, for example, thermistors, and detect the temperature of the cooling water. For example, temperature sensors of other types such as thermocouples may be used as long as they can detect a water temperature. The water temperature sensors (189A, 189B) are positioned in the water channel near the inflow port 85, which allows the cooling water supplied from the outside of the housing 45 to flow into the inside of the housing 45. As illustrated in FIG. 10, for example, detection parts of the water temperature sensors (189A, 189B) are positioned inside a water channel 191 formed inside the cooling water head 83. The water channel 191 is formed near the inflow port 85 and communicatively connects to the inflow port 85. A water channel 193 is formed near the outflow port 87 and communicatively connects to the outflow port 87. By installing two water temperature sensors (189A, 189B), double assurance is achieved and reliability is improved. However, it is also possible that only one water temperature sensor is used.

The water temperature sensors (189A, 189B) transmit detected water temperatures to the irradiation control device 15. A third determination part 215 (see FIG. 13) of the irradiation control device 15 determines whether or not a detected temperature of the water temperature sensors (189A, 189B) is within a predetermined temperature range. The predetermined temperature range is set according to a laser beam intensity, specifications of the irradiation device 13, and the like, and, for example, is 27 degrees to 34 degrees. When the third determination part 215 determines that the detected temperature is outside the predetermined temperature range, the irradiation stopping part 219 (see FIG. 13) of the irradiation control device 15 stops irradiation of the laser beam. As a result, when the temperature of the cooling water flowing into the housing 45 of the irradiation device 13 is too high or too low with respect to a suitable temperature range, the irradiation of the laser beam can be immediately stopped. Therefore, safety performance can be improved.

6. Positioning Structure of Temperature Sensors of Mirror Holding Part

Figure 11:
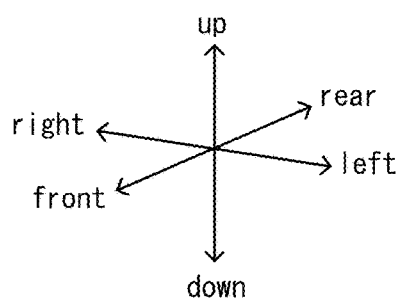
FIG. 11 is a perspective view illustrating an example of a structure near a holding part of an X-axis mirror with a part of a mirror housing illustrated as a cross section.
Figure 11:
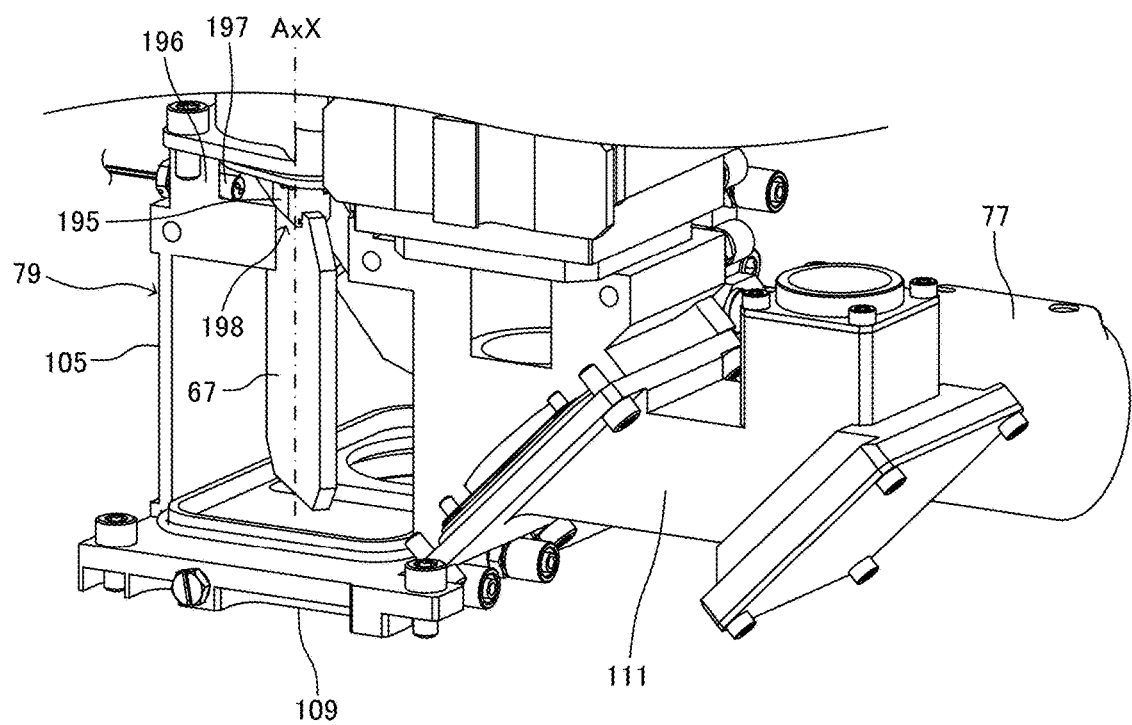
Figure 12:
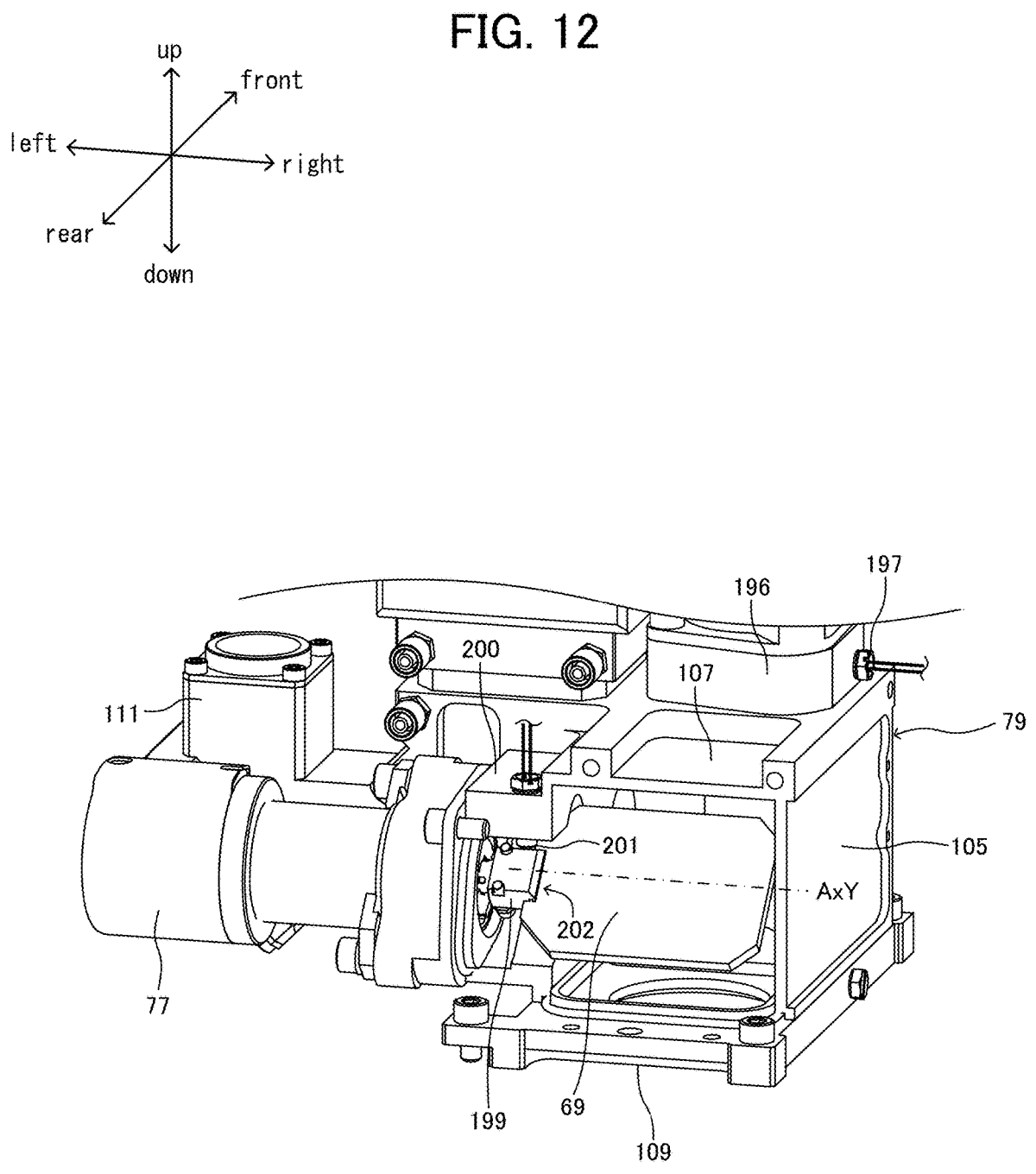

An example of a positioning structure of temperature sensors of a holding part of the X-axis mirror 67 and the Y-axis mirror 69 is described with reference to FIGS. 11 and 12. FIG. 11 is a perspective view illustrating an example of a structure near a holding part of the X-axis mirror 67 with a part of the mirror housing 79 illustrated as a cross section. FIG. 12 is a perspective view illustrating an example of a structure near a holding part of the Y-axis mirror 69 with a part of the mirror housing 79 illustrated as a cross section. The directions illustrated in FIGS. 11 and 12 correspond to the directions illustrated in FIGS. 2 and 3 and the like.

As illustrated in FIG. 11, inside the mirror housing 79, the X-axis mirror 67 is positioned rotatable around the X axis (AxX) by the X-axis motor 75. The X-axis mirror 67 is held by a mirror holder 195 rotated by the X-axis motor 75. The X-axis mirror 67 is made of, for example, glass such as quartz glass, and the mirror holder 195 is made of, for example, stainless steel. The X-axis mirror 67 is fixed to the mirror holder 195 with an adhesive. The adhesive may melt when the temperature exceeds its heat resistant temperature, and in this case, there is a risk that the X-axis mirror 67 may fall off from the mirror holder 195. Therefore, it is preferable to monitor the temperature of the adhesive.

As illustrated in FIG. 11, a temperature sensor 197 is provided penetrating through a motor attachment part 196, which is provided on the upper wall part 107 of the mirror housing 79, in the left-right direction. The motor attachment part 196 is, for example, integrally molded with the mirror housing 79. It is also possible that the motor attachment part 196 is structured as a separate body. The temperature sensor 197 (an example of a second temperature sensor) is, for example, a thermistor, and a detection part thereof is positioned in a vicinity of a holding part 198 of the X-axis mirror 67 by the mirror holder 195. The "vicinity" is a position where the temperature sensor 197 can be prevented from interfering with the rotational drive of the mirror holder 195 and the temperature of the adhesive that adheres the mirror holder 195 and the X-axis mirror 67 can be approximately detected. That is, the temperature sensor 197 can approximately detect the temperature of the adhesive inside the mirror housing 79. As the temperature sensor 197, for example, temperature sensors of other types such as thermocouples may be used as long as they can detect the temperature in the vicinity of the holding part 198.

As illustrated in FIG. 12, inside the mirror housing 79, the Y-axis mirror 69 is positioned rotatable around the Y axis (AxY) by the Y-axis motor 77. The Y-axis mirror 69 is held by a mirror holder 199 rotated by the Y-axis motor 77. The Y-axis mirror 69 is made of, for example, glass such as quartz glass, and the mirror holder 199 is made of, for example, resin. The Y-axis mirror 69 is fixed to the mirror holder 199 with an adhesive. The adhesive may melt when the temperature exceeds its heat resistant temperature, and in this case, there is a risk that the Y-axis mirror 69 may fall off from the mirror holder 199. Therefore, it is preferable to monitor the temperature of the adhesive.

As illustrated in FIG. 12, a temperature sensor 201 is provided penetrating through a motor attachment part 200, which is provided on the left wall part 103 of the mirror housing 79, in the up-down direction. The motor attachment part 200 is, for example, integrally molded with the mirror housing 79. It is also possible that the motor attachment part 200 is structured as a separate body. The temperature sensor 201 (an example of a second temperature sensor) is, for example, a thermistor, and a detection part thereof is positioned in a vicinity of a holding part 202 of the Y-axis mirror 69 by the mirror holder 199. The "vicinity" is a position where the temperature sensor 201 can be prevented from interfering with the rotational drive of the mirror holder 199 and the temperature of the adhesive that adheres the mirror holder 199 and the Y-axis mirror 69 can be approximately detected. That is, the temperature sensor 201 can approximately detect the temperature of the adhesive inside the mirror housing 79. As the temperature sensor 201, for example, temperature sensors of other types such as thermocouples may be used as long as they can detect the temperature in the vicinity of the holding part 202. Further, it is also possible to position two temperature sensors 197 and two temperature sensors 201 to achieve double assurance and improve reliability.

The temperature sensors (197, 201) transmit detected temperatures to the irradiation control device 15. A fourth determination part 217 (see FIG. 13) of the irradiation control device 15 determines whether or not at least one of the detected temperatures of the temperature sensors (197, 201) is equal to or higher than a predetermined temperature. The "predetermined temperature" is, for example, the heat resistant temperature of the adhesive. When the fourth determination part 217 determines that a detected temperature is equal to or higher than the predetermined temperature, the irradiation stopping part 219 (see FIG. 13) of the irradiation control device 15 immediately stops the irradiation of the laser beam. As a result, it is possible to prevent the mirrors (67, 69) from falling off from the mirror holders (195, 199) due to melting of the adhesives. Therefore, safety performance can be improved.

Figure 13:
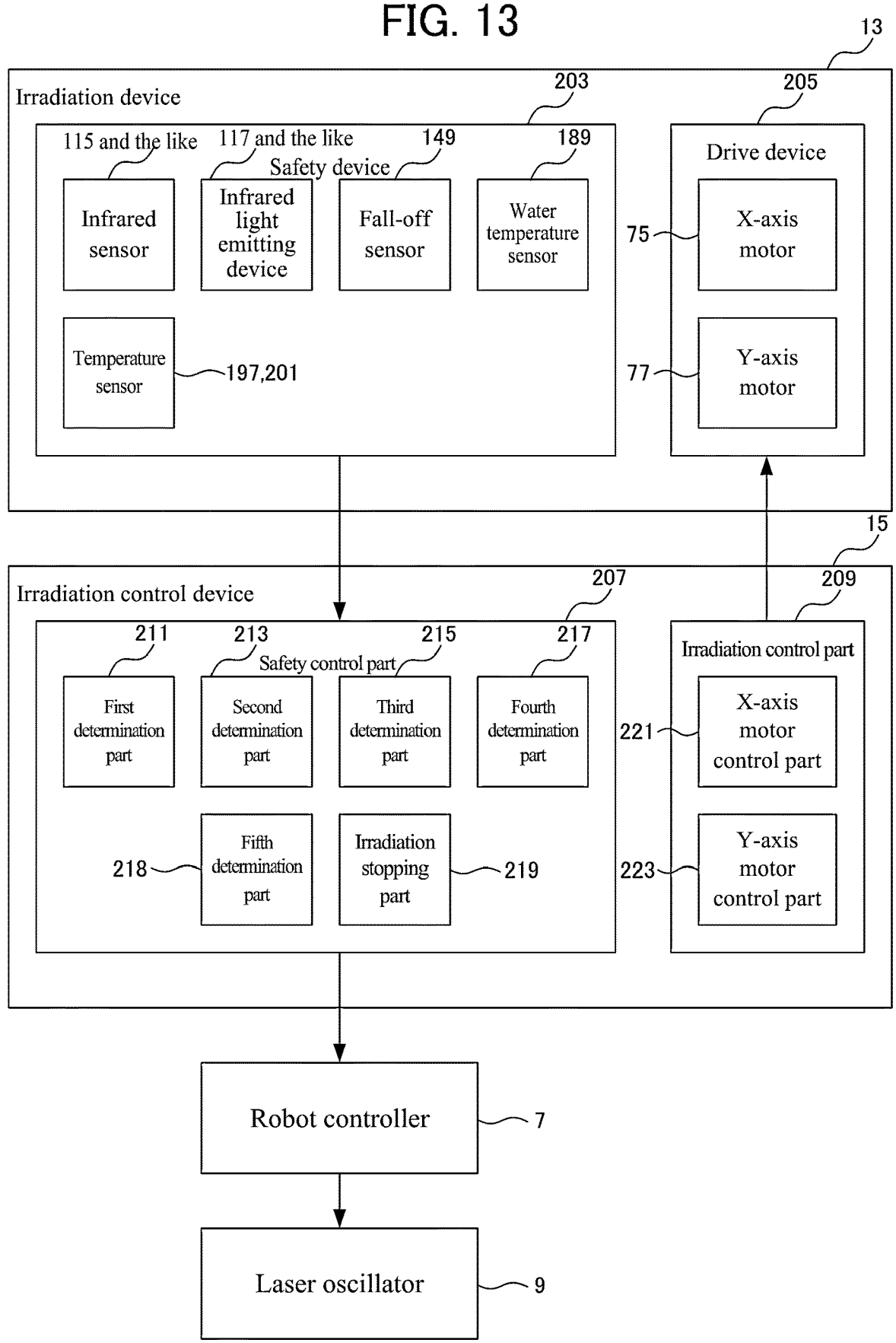
FIG. 13 is a block diagram illustrating an example of functional structures of the irradiation device and an irradiation control device.
Figure 14:
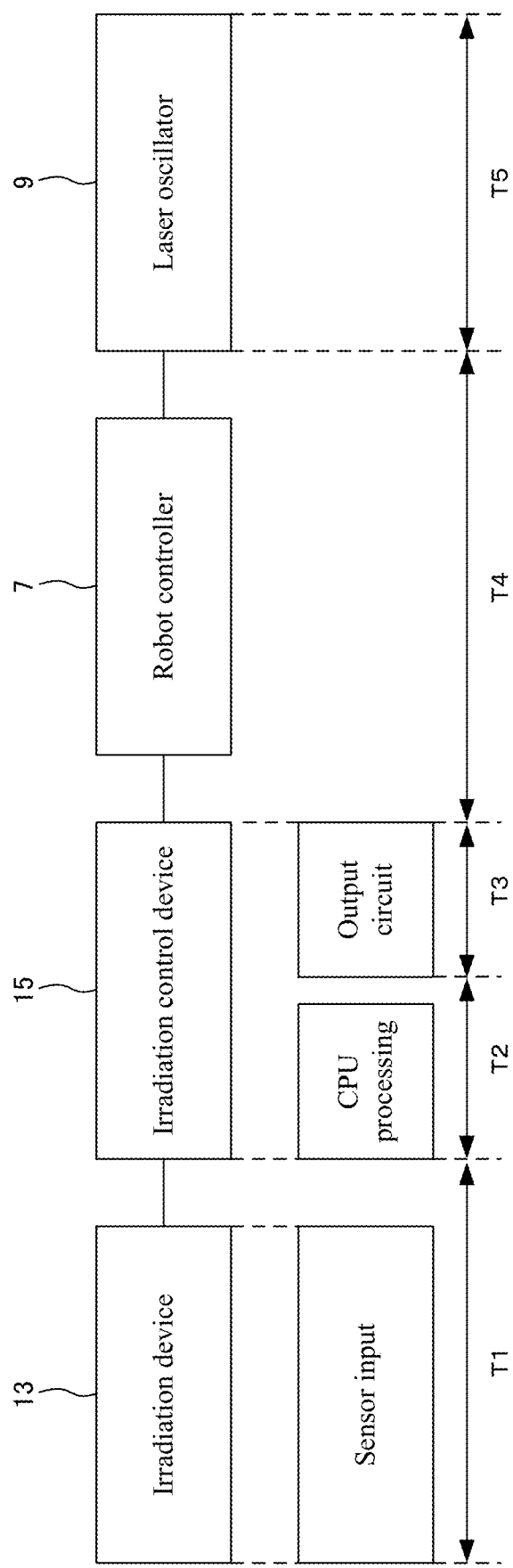
FIG. 14 is an explanatory diagram illustrating an example of a relationship between a sum of processing times of devices and a target time for preventing melting when an inner wall of the mirror housing is irradiated with a laser beam.

7. Functional Structures of Irradiation Device and Irradiation Control Device An example of functional structures and the like of the irradiation device 13 and the irradiation control device 15 is described with reference to FIGS. 13 and 14. FIG. 13 is a block diagram illustrating an example of the functional structures of the irradiation device 13 and the irradiation control device 15. FIG. 14 is an explanatory diagram illustrating an example of a relationship between a sum of processing times of the devices and a target time (T) for preventing melting when an inner wall of the mirror housing 79 is irradiated with a laser beam.

As illustrated in FIG. 13, the irradiation device 13 includes a safety device 203 and a drive device 205. The safety device 203 includes the infrared sensors 115 and the like, the infrared light emitting device 117 and the like, the fall-off sensors (149L, 149R), the water temperature sensors (189A, 189B), and the temperature sensors (197, 201). The drive device 205 includes the X-axis motor 75 and the Y-axis motor 77. In FIG. 13, the reference numeral symbols of the elements of the safety device 203 are simplified in the illustration.

The irradiation control device 15 includes a safety control part 207 and an irradiation control part 209. The safety control part 207 includes the first determination part 211, the second determination part 213, the third determination part 215, the fourth determination part 217, the fifth determination part 218, and the irradiation stopping part 219.

The first determination part 211 determines whether or not at least one infrared sensor among the infrared sensors 115 and the like has detected infrared light of a specific wavelength. When the first determination part 211 has determined that infrared light of a specific wavelength has been detected, the irradiation stopping part 219 transmits an abnormality signal to the robot controller 7. Upon receiving the abnormality signal, the robot controller 7 transmits an emergency stop signal to the laser oscillator 9. Upon receiving the emergency stop signal, the laser oscillator 9 immediately stops output of the laser beam to the irradiation device 13.

The second determination part 213 determines whether or not a detection abnormality of infrared light for failure diagnosis emitted from the infrared light emitting device 117 and the like has occurred in at least one infrared sensor among the infrared sensors 115 and the like. When the second determination part 213 has determined that a detection abnormality has occurred in at least one of the infrared sensors, the irradiation stopping part 219 transmits an abnormality signal to the robot controller 7. Upon receiving the abnormality signal, the robot controller 7 transmits an emergency stop signal to the laser oscillator 9. Upon receiving the emergency stop signal, the laser oscillator 9 immediately stops output of the laser beam to the irradiation device 13.

The third determination part 215 determines whether or not the detected temperatures of the water temperature sensors (189A, 189B) are within a predetermined temperature range. When the third determination part 215 has determined that the detected temperature of one of the water temperature sensors (189A, 189B) is out of the predetermined temperature range, the irradiation stopping part 219 transmits an abnormality signal to the robot controller 7. Upon receiving the abnormality signal, the robot controller 7 transmits an emergency stop signal to the laser oscillator 9. Upon receiving the emergency stop signal, the laser oscillator 9 immediately stops output of the laser beam to the irradiation device 13.

The fourth determination part 217 determines whether or not the detection temperature of at least one of the temperature sensors (197, 201) is equal to or higher than a predetermined temperature. When the fourth determination part 217 has determined that the detected temperature is equal to or higher than the predetermined temperature, the irradiation stopping part 219 transmits an abnormality signal to the robot controller 7. Upon receiving the abnormality signal, the robot controller 7 transmits an emergency stop signal to the laser oscillator 9. Upon receiving the emergency stop signal, the laser oscillator 9 immediately stops output of the laser beam to the irradiation device 13.

The fifth determination part 218 determines whether or not a size of a falling off received from at least one of the fall-off sensors (149L, 149R) is greater than a predetermined distance. When the size of the falling off detected by at least one of the fall-off sensors (149L, 149R) of the irradiation device 13 is larger than the predetermined distance, the irradiation stopping part 219 of the irradiation control device 15 transmits an abnormality signal to the robot controller 7. Upon receiving the abnormality signal, the robot controller 7 transmits an emergency stop signal to the laser oscillator 9. Upon receiving the emergency stop signal, the laser oscillator 9 immediately stops output of the laser beam to the irradiation device 13.

The irradiation control part 209 includes an X-axis motor control part 221 and a Y-axis motor control part 223. The X-axis motor control part 221 controls a rotation angle of the X-axis mirror 67 around the X axis (AxX) by controlling a rotational operation of the X-axis motor 75. The Y-axis motor control part 223 controls a rotation angle of the Y-axis mirror 69 around the Y axis (AxY) by controlling a rotational operation of the Y-axis motor 77.

In the present embodiment, when the safety control part 207 of the irradiation control device 15 detects an abnormality in the irradiation device 13, the robot controller 7 receives an abnormality signal from the irradiation control device 15. As a result, in addition to stopping the output of the laser beam by the laser oscillator 9, the robot controller 7 can also execute a safe operation with respect to the robot 5. The safe operation is, for example, stopping the operation of the robot 5, slowing down an operation speed, retracting the irradiation device 13 to a predetermined position, or the like. Therefore, the safety performance can be further improved. When the irradiation stopping part 219 has determined an abnormality, an emergency stop signal may be transmitted to the laser oscillator 9 without going through the robot controller 7. In this case, it is possible to stop the oscillation of the laser beam earlier.

The irradiation control device 15 may transmit, for example, a warning signal or the like depending on a predetermined determination process before transmitting an abnormality signal to the robot controller 7. As a result, the robot controller 7 can take measures such as outputting a warning or an alarm as a preliminary step before stopping the laser beam in an emergency.

FIG. 14 illustrates the relationship between the sum of the processing times of the devices and the target time (T). T1 is a processing time by the irradiation device 13, for example, a sum of an input time from various sensors and a transmission time to the irradiation control device 15. T2 and T3 are processing times by the irradiation control device 15. For example, T2 is a processing time by a CPU 901 (see FIG. 15) of the irradiation control device 15, and T3 is a processing time by an output circuit (not illustrated in the drawings). T4 is a processing time by the robot controller 7, for example, a time from transmission of an abnormality signal from the irradiation control device 15 to reception of an emergency stop signal by the laser oscillator 9. T5 is a processing time by the laser oscillator 9, for example, a time from when the laser oscillator 9 receives an emergency stop signal until the oscillation of the laser beam is stopped. The target time (T) is a target time for preventing melting when the inner wall of the mirror housing 79 is irradiated with a laser beam, and is set, for example, according to specifications such as the material and thickness of the mirror housing 79, the intensity of the laser beam, and the like. The sum of the processing times T1+T2+T3+T4+T5 is smaller than the target time (T). As a result, even when some abnormality occurs in the irradiation device 13, it is possible to improve certainty that the laser beam can be stopped before the mirror housing 79 starts to melt. As described above, when an emergency stop signal is transmitted from the irradiation control device 15 to the laser oscillator 9 without going through the robot controller 7, the sum of the processing times is T1+T2+T3+T5, and the time from the detection of an abnormality to the stop of the laser beam can be further shortened.

The processings and the like in the first determination part 211, the second determination part 213, the third determination part 215, the fourth determination part 217, the irradiation stopping part 219, and the like described above are not limited to the example of division of these processings. For example, it may be processed by a smaller number of processing parts (for example, one processing part), or may be processed by further subdivided processing parts. Further, in the irradiation control device 15, it is possible that only the part that supplies the drive power to the X-axis motor 75 and the Y-axis motor 77 is realized by an actual device, and other functions are realized by a program executed by the CPU 901 (see FIG. 15) to be described later. Further, the first determination part 211, the second determination part 213, the third determination part 215, the fourth determination part 217, the irradiation stopping part 219, and the like may be realized in part or in whole by an actual device such as an ASIC, an FPGA, or other electrical circuits.

8. Effect of Embodiment

As described above, the laser processing device 3 of the present embodiment includes the irradiation device 13 that irradiates a laser beam to a workpiece. The irradiation device 13 includes: the housing 45; the mirror housing 79 that is positioned inside the housing 45 and houses at least a part of the path of the laser beam; and at least one of the infrared sensors 115 and the like that is positioned inside the housing 45 and is positioned around the mirror housing 79.

When some abnormality occurs in the irradiation device 13, the path of the laser beam may change in an unintended direction and the laser beam may irradiate the inner wall of the mirror housing 79 that houses a part of the path. When the mirror housing 79 melts and the laser beam penetrates, there is a risk that the laser beam may irradiate the inner wall of the housing 45 on an outer side of the mirror housing 79, and further, when the housing 45 melts and is penetrated, the laser beam may irradiate the outside of the irradiation device 13.

In the present embodiment, the infrared sensors 115 and the like are positioned around the mirror housing 79. As a result, when the laser beam irradiates an inner wall of the mirror housing 79, by detecting infrared light radiated from the wall part, it is possible to detect a rise in the temperature of the wall part before the wall part melts. When a temperature sensor (such as a thermistor or a thermocouple) is installed on an outer wall of the mirror housing 79 to detect a temperature rise, the temperature can be detected only spot-wise. Therefore, in a situation where it is unclear which part of the inner wall is irradiated with the laser beam, it is desirable to position temperature sensors at many places on the outer wall from a point of view of safety. On the other hand, when the number of the temperature sensors is reduced, there is a possibility that, when it is detected by the temperature sensors, the mirror housing 79 has already melted due to the time required for heat conduction up to that place. In the present embodiment, as the infrared sensors 115 and the like, for example, infrared sensors that each have a detection area that expands into a conical shape are used. Thereby, it is possible to monitor a wide range with one infrared sensor. As a result, it is possible to detect an abnormality before the mirror housing 79 melts without using a large number of sensors.

As described above, according to the present embodiment, it is possible to detect that an abnormality has occurred before the laser beam penetrates the mirror housing 79 inside the housing 45. Therefore, safety performance can be improved.

Further, in the present embodiment, in particular, multiple infrared sensors 115 and the like are provided and are respectively positioned corresponding to multiple wall parts (for example, the front wall part 99, the rear wall part 101, the left wall part 103, the right wall part 105, the upper wall part 107, and the lower wall part 109) forming the mirror housing 79.

When the path of the laser beam changes in an unintended direction due to an abnormality in the irradiation device 13, it is unknown which inner wall of multiple surfaces forming the mirror housing 79 is irradiated with the laser beam. Therefore, by respectively positioning the multiple infrared sensors corresponding to the multiple surfaces forming the mirror housing 79, it is possible to monitor a temperature rise with respect to the multiple surfaces of the mirror housing 79, and the safety performance can be further improved.

Further, in the present embodiment, in particular, the irradiation device 13 includes the X-axis mirror 67 that reflects the laser beam and the Y-axis mirror 69 that further reflects the laser beam reflected by the X-axis mirror 67. The mirror housing 79 houses the X-axis mirror 67 and the Y-axis mirror 69.

For example, when an abnormality occurs such as that the X-axis mirror 67 or the Y-axis mirror 69 falls off or is damaged, there is a possibility that the path of the laser beam may change in an unintended direction and may irradiate the inner wall of the mirror housing 79 that houses the mirrors. In the present embodiment, even in such a case, it is possible to detect that an abnormality has occurred before the laser beam penetrates the mirror housing 79.

Further, in the present embodiment, in particular, the irradiation control device 15 that controls the irradiation device 13 is further provided. The irradiation control device 15 includes: the first determination part 211 that determines whether or not at least one of the infrared sensors 115 and the like has detected infrared light of a specific wavelength; and the irradiation stopping part 219 that stops the irradiation of the laser beam when the first determination part 211 has determined that the infrared light has been detected.

As a result, when a temperature rise of the mirror housing 79 is detected by the infrared sensors 115 and the like, the irradiation of the laser beam can be stopped. Further, since the temperature of a wall part of the mirror housing 79 is related to the wavelength of the emitted infrared light, by determining whether or not infrared light of a specific wavelength has been detected, it is possible to detect whether or not the temperature of the wall part has reached a specific temperature. Therefore, by specifying a wavelength corresponding to a temperature before melting according to the material of the mirror housing 79, the certainty that the irradiation of the laser beam can be stopped before the mirror housing 79 melts is increased, and the safety performance can be further improved.

Further, in the present embodiment, in particular, the irradiation device 13 includes at least one of the infrared light emitting device 117 and the like that is positioned opposing at least one of the infrared sensors 115 and the like inside the housing 45 and emits infrared light for failure diagnosis at a predetermined time interval. The irradiation control device 15 includes the second determination part 213 that determines whether or not a detection abnormality of the infrared light has occurred in at least one of the infrared sensors 115 and the like. The irradiation stopping part 219 stops the irradiation of the laser beam when the second determination part 213 has determined that a detection abnormality of the infrared light has occurred.

As a result, failure diagnosis of the infrared sensors can be performed at all times. Further, since the irradiation of the laser beam is stopped when an abnormality or failure occurs in at least one of the infrared sensors 115 and the like, the safety performance can be further improved.

Further, in the present embodiment, in particular, the irradiation device 13 includes the bracket 91 for attaching to the robot 5 and the fall-off sensors (149L, 149R) for detecting presence or absence of a falling off of bracket 91 from the robot 5.

The irradiation device 13 is attached to the robot 5, and performs laser processing while being moved by the robot 5. The irradiation device 13 is attached to the robot 5 via the bracket 91. However, for example, when the bolts 157 that fix the bracket 91 to the robot 5 are loosened or forgotten to be tightened, there is a possibility that a falling off or the like of the bracket 91 from the robot 5 may occur. When the falling off occurs, there is a possibility that, even when the robot 5 and the irradiation device 13 operate normally, the laser beam may be irradiated in an unintended direction.

In the present embodiment, by providing the fall-off sensors (149L, 149R), a falling off of the bracket 91 from the robot 5 can be detected. As a result, when the falling off is detected, it is possible to take measures such as immediately stopping the irradiation of the laser beam. Therefore, the safety performance can be improved.

Further, in the present embodiment, in particular, the fall-off sensors (149L, 149R) are a pair of limit switches that are attached to the bracket 91 and are respectively positioned on one side and the other side of the rotation axis (Ax6) at the front end part of the robot 5 to which the bracket 91 is fixed.

As a result, it can be detected when a falling off occurs between the bracket 91 of the irradiation device 13 and the flange part 31, which is the front end part of the robot 5, not only on both sides of the rotation axis (Ax6), but also on either the one side or the other side of the rotation axis (Ax6). Therefore, the falling off can be detected before the bracket 91 completely falls out from the front end part of the robot 5. Further, by using limit switches as the fall-off sensors (149L, 149R), a falling off can be physically detected, and thus, the certainty of detection can be improved. Therefore, the safety performance can be further improved.

Further, in the present embodiment, in particular, the laser processing system 1 further includes the irradiation control device 15 that controls the irradiation device 13. The irradiation control device 15 includes the irradiation stopping part 219 that stops the irradiation of the laser beam when at least one of the pair of fall-off sensors (149L, 149R) has detected a falling off.

As a result, when a falling off is detected on at least one side of the rotation axis (Ax6) between the bracket 91 of the irradiation device 13 and the flange part 31 of the robot 5, the irradiation of the laser beam can be immediately stopped. Therefore, safety performance can be improved.

Further, in the present embodiment, in particular, the irradiation device 13 includes: the water channels (181, 183) that are positioned inside the housing 45 and through which the cooling water flows; and the water temperature sensors (189A, 189B) that are positioned inside the housing 45 and detect the temperature of the cooling water flowing through the water channels (181, 183).

As a result, the water temperature of the cooling water for cooling the inside of the irradiation device 13 can be monitored by the water temperature sensors (189A, 189B). As a result, the inside of the irradiation device 13 can be maintained at an appropriate temperature, and thus, the safety performance can be improved.

Further, in the present embodiment, in particular, the water temperature sensors (189A, 189B) are positioned in the water channel 191 near the inflow port 85, which allows the cooling water supplied from the outside of the housing 45 to flow into the inside of the housing 45.

In the present embodiment, the water temperature sensors (189A, 189B) monitor not the temperature of the cooling water flowing out of the housing 45 of the irradiation device 13, but the temperature of the cooling water flowing into the housing 45 of the irradiation device 13. As a result, the inside of the irradiation device 13 can be maintained at an appropriate temperature, and thus, the safety performance can be improved.

Further, in the present embodiment, in particular, the irradiation control device 15 includes: the third determination part 215 that determines whether or not a detected temperature of the water temperature sensors (189A, 189B) is within a predetermined temperature range; and the irradiation stopping part 219, that stops the irradiation of the laser beam when the third determination part 215 has determined that the detected temperature is outside the predetermined temperature range.

For example, when the temperature of the cooling water flowing into the housing 45 of the irradiation device 13 is too high, there is a possibility that the internal temperature of the irradiation device 13 rises and the components and optical instruments forming the path of the laser beam cannot be maintained at an appropriate temperature. On the other hand, when the temperature of the cooling water is too low, there is a possibility that dew condensation occurs on the components and optical instruments forming the path of the laser beam, and causes a malfunction. Therefore, the temperature of the cooling water is preferably within an appropriate temperature range. In the present embodiment, when a detected temperature of the cooling water is outside a predetermined temperature range, the irradiation of the laser beam can be immediately stopped. Therefore, safety performance can be improved.

Further, in the present embodiment, in particular, the irradiation device 13 includes: the X-axis mirror 67 that reflects a laser beam; the mirror holder 195 that holds the X-axis mirror 67; the Y-axis mirror 69 that further reflects the laser beam reflected by the X-axis mirror 67; the mirror holder 199 that holds the Y-axis mirror 69; and the temperature sensors (197, 201) that are positioned in the vicinity of at least one of the holding part 198 of the X-axis mirror 67 by the mirror holder 195 and the holding part 202 of the Y-axis mirror 69 by the mirror holder 199 and detect the temperature in the vicinity of the holding parts (198, 202).

In the present embodiment, the X-axis mirror 67 and the Y-axis mirror 69 are respectively fixed to the mirror holder 195 and the mirror holder 199 by an adhesive. The adhesive may melt when the temperature exceeds its heat resistant temperature, and in this case, there is a risk that the mirrors may fall off from the mirror holders.

In the present embodiment, the temperature sensors (197, 201) are provided in the vicinities of the holding portion 198 of the X-axis mirror 67 and the holding portion 202 of the Y-axis mirror 69. By positioning the temperature sensors (197, 201) in the vicinities the holding parts (198, 202) rather than directly on the holding parts, the temperature of the adhesive can be approximately detected while preventing the temperature sensors (197, 201) from interfering with the rotational drive of the mirror holders (195, 199). As a result, the temperature of the adhesive can be monitored, and measures such as stopping the irradiation of the laser beam can be taken before the temperature of the adhesive reaches its melting temperature, and thus, the safety performance can be improved.

Further, in the present embodiment, in particular, the irradiation control device 15 includes: the fourth determination part 217 that determines whether or not a detected temperature of the temperature sensors (197, 201) is equal to or higher than a predetermined temperature; and the irradiation stopping part 219 that stops the irradiation of the laser beam when the fourth determination part 217 has determined that the detected temperature is equal to or higher than the predetermined temperature.

In the present embodiment, when the temperature of the adhesive rises to the predetermined temperature or higher, the irradiation of the laser beam can be immediately stopped. As a result, it is possible to prevent the mirrors (67, 69) from falling off from the mirror holders (195, 199) due to melting of the adhesives. Therefore, safety performance can be improved.

Further, as explained above, the laser processing system 1 of the present embodiment includes: the laser processing device 3 that includes the irradiation device 13 and the irradiation control device 15 described above; the robot 5 to which the irradiation device 13 is attached; and the robot controller 7 that controls the robot 5.

In the present embodiment, while the robot controller 7 controls the robot 5 to move the irradiation device 13 to a desired position, the irradiation control device 15 can control an irradiation direction of a laser beam by controlling the irradiation device 13. As a result, by combining a movement of the robot 5 and scanning of a laser beam of the irradiation device 13, for example, wide laser welding, marking processing of complicated shapes, and the like can be executed.

Further, in the present embodiment, in particular, the laser processing system 1 further includes the laser oscillator 9 that oscillates a laser beam to the irradiation device 13. The irradiation control device 15 includes the irradiation stopping part 219 that, via the robot controller 7, causes the laser oscillator 9 to stop the oscillation of the laser beam when an abnormality occurs in the irradiation device 13.

In the present embodiment, the robot controller 7 can also receive an abnormality signal of the irradiation device 13 from the irradiation control device 15. As a result, the irradiation control device 15 can stop the oscillation of the laser beam, and the robot controller 7 can execute a safe operation with respect to the robot 5. Therefore, the safety performance can be further improved.

9. Example of Hardware Structure of Irradiation Control Device

Figure 15:
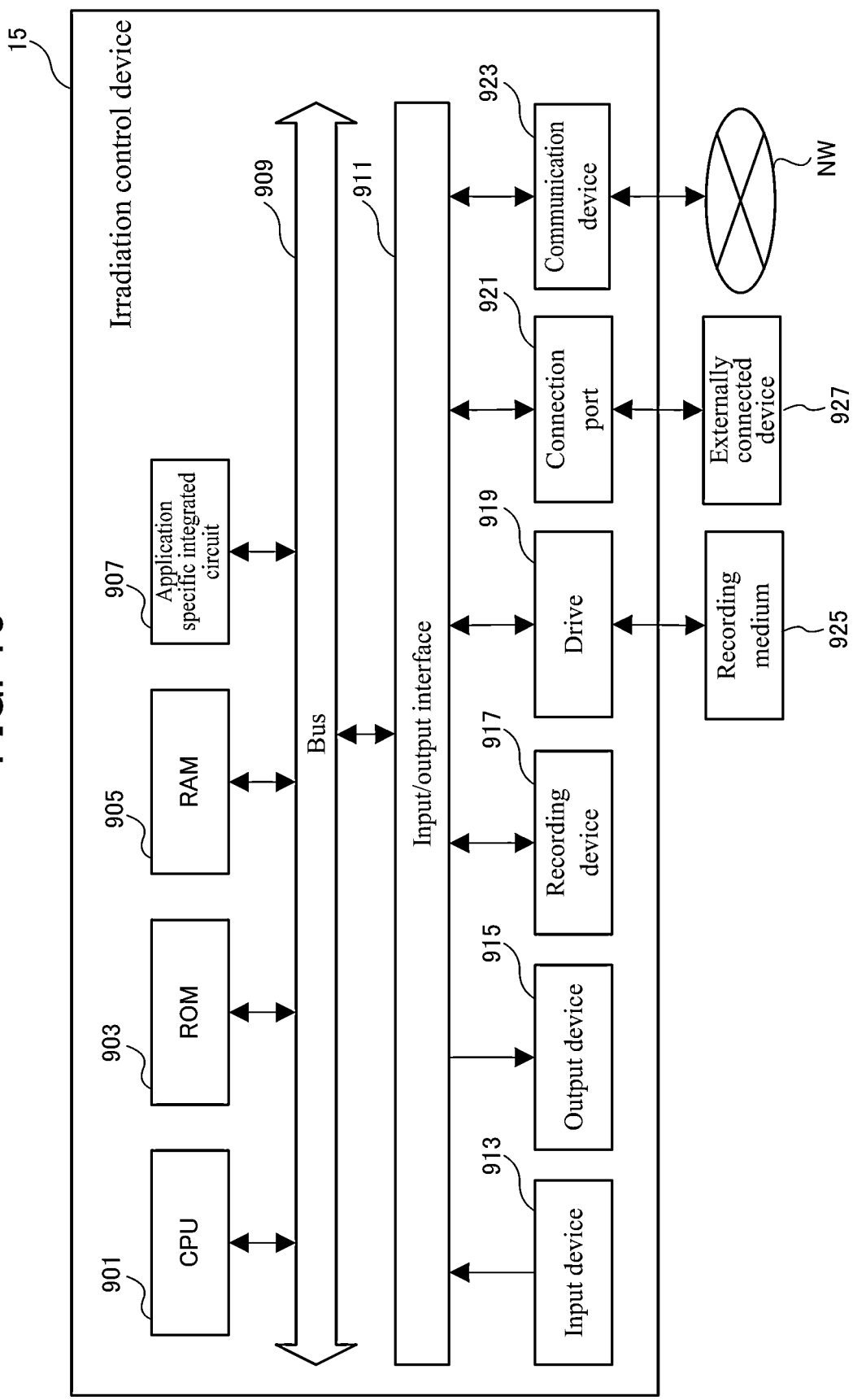
FIG. 15 is a block diagram illustrating an example of a hardware structure of a controller.

Next, an example of a hardware structure of the irradiation control device 15 described above is described with reference to FIG. 15. In FIG. 15, a structure related to the function of supplying drive power to the X-axis motor 75, the Y-axis motor 77, and the like of the irradiation device 13 is omitted as appropriate.

As illustrated in FIG. 15, the irradiation control device 15 includes: for example, the CPU 901; a ROM 903; a RAM 905; an application specific integrated circuit 907 constructed for a specific application such as an ASIC or an FPGA; an input device 913; an output device 915; a recording device 917; a drive 919; a connection port 921; and a communication device 923. These structural components are connected such that signals can be transmitted to each other via a bus 909 or an input/output interface 911.

A program can be recorded, for example, in the ROM 903, the RAM 905, the recording device 917 (which is formed of a hard disk, or the like), or the like.

Further, a program can also be recorded temporarily or non-temporarily (permanently), for example, in a removable recording medium 925 such as a magnetic disk (such as a flexible disk), an optical disc (such as various CDs, MO disks, or DVDs), and a semiconductor memory. Such a recording medium 925 can also be provided as so-called package software. In this case, a program recorded on the recording medium 925 may be read by the drive 919 and recorded on the recording device 917 via the input/output interface 911, the bus 909, or the like.

Further, a program can also be recorded, for example, at a download site, on another computer, another recording device, or the like (which are not illustrated in the drawings). In this case, the program is transferred via a network (NW) such as an LAN or the Internet, and the communication device 923 receives the program. Then, the program received by the communication device 923 may be recorded in the recording device 917 via the input/output interface 911, the bus 909, or the like.

Further, a program can also be recorded, for example, in an appropriate externally connected device 927. In this case, the program may be transferred via the appropriate connection port 921 and recorded in the recording device 917 via the input/output interface 911, the bus 909, or the like.

Then, the CPU 901 executes various processings according to a program recorded in the recording device 917, and thereby, the processings by the safety control part 207 and the like are realized. In this case, for example, the CPU 901 may read the program directly from the recording device 917 and execute the program, or may load the program into the RAM 905 and then execute the program. Further, for example, when the program is received via the communication device 923, the drive 919, or the connection port 921, the CPU 901 may directly execute the received program without recording the program in the recording device 917.

Further, for example, when necessary, the CPU 901 may perform various processings based on signals or information input from the input device 913 such as a mouse, a keyboard, and a microphone (not illustrated in the drawings).

Then, for example, the CPU 901 may output a result of executing the above processing from the output device 915 such as a display device or an audio output device. Further, when necessary, the CPU 901 may transmit this processing result via the communication device 923 or the connection port 921, or may record the processing result in the recording device 917 or the recording medium 925.

In the above description, when there is a description such as "vertical," "parallel," "flat surface," or the like, the description is not in a strict sense. That is, "vertical," "parallel" or "flat surface" means "substantially vertical," "substantially parallel" or "substantially flat surface," when tolerances and errors in design and in manufacturing are within allowed ranges.

Further, in the above description, when there is a description such as that an external dimension or size, a shape, a position, or the like is "identical," "same," "equal," "different," or the like, the description is not in a strict sense. That is, "identical," "same," "equal" or "different" means "substantially identical," "substantially same," "substantially equal" or "substantially different" when tolerances and errors in design and in manufacturing are within allowed ranges.

Further, in addition to those already described above, methods according to the above-described embodiment and modified embodiments may also be appropriately combined and utilized. In addition, although not illustrated, various modifications may be made to the above-described embodiment and modified embodiments within the scope without departing from the spirit thereof.

According to one aspect of the present invention, a laser processing device is applied that includes an irradiation device that irradiates a laser beam to a workpiece. The irradiation device includes: a housing; a box that is positioned inside the housing and houses at least a part of a path of the laser beam; and at least one infrared sensor that is positioned inside the housing and is positioned around the box.

Further, according to another aspect of the present invention, a laser processing system is applied that includes: the above laser processing device that includes an irradiation device that irradiates a laser beam to a workpiece, and a first control device that controls the irradiation device; an automatic machine to which the irradiation device is attached; and a second control device that controls the automatic machine.

Further, according to another aspect of the present invention, a laser processing method is applied for processing a workpiece by irradiating a laser beam to workpiece by an irradiation device. The irradiation device includes: a housing; a box that is positioned inside the housing and houses at least a part of a path of the laser beam; and at least one infrared sensor that is positioned inside the housing and is positioned around the box. The laser processing method includes: determining whether or not the at least one infrared sensor has detected first infrared light of a specific wavelength; and stopping the irradiation of the laser beam when it is determined that the first infrared light has been detected.

A laser processing device according to an embodiment of the present invention further improves safety performance.

Obviously, numerous modifications and variations of the present invention are possible in light of the above teachings. It is therefore to be understood that within the scope of the appended claims, the invention may be practiced otherwise than as specifically described herein.

What is claimed is:

1. A laser processing system, comprising:
    an irradiation device configured to irradiate a laser beam to a workpiece, the irradiation device including:
        a housing,
        a box positioned inside the housing and housing at least a part of a path of the laser beam, and
        at least one infrared sensor positioned inside the housing and around the box, the at least one infrared sensor being positioned to directly detect first infrared light from a mirror reflecting the laser beam without an element therebetween; and
    first control circuitry configured to
        determine whether or not the at least one infrared sensor of the irradiation device has detected the first infrared light of a specific wavelength, and
        stop irradiation of the laser beam by the irradiation device when the first infrared light is detected.

2. The laser processing system according to claim 1, wherein the at least one infrared sensor includes a plurality of infrared sensors positioned corresponding to a plurality of wall parts forming the box, respectively.

3. The laser processing system according to claim 1, wherein the irradiation device further includes a first mirror configured to reflect the laser beam and a second mirror configured to further reflect the laser beam reflected by the first mirror, and the box houses the first mirror and the second mirror.

4. The laser processing system according to claim 1, wherein the irradiation device further includes at least one infrared light emitting device positioned opposing the at least one infrared sensor inside the housing and configured to emit second infrared light providing failure diagnosis at a predetermined time interval, and the first control circuitry is further configured to determine whether or not a detection abnormality of the second infrared light has occurred in the at least one infrared sensor, and stop the irradiation of the laser beam when a detection abnormality of the second infrared light has occurred.

5. The laser processing system according to claim 1, wherein the irradiation device further includes an attachment device configured to attach the housing to an automatic machine, and a fall-off sensor configured to detect an occurrence of a disengagement of the attachment device from the automated machine.

6. The laser processing system according to claim 5, wherein the fall-off sensor further includes a pair of limit switches attached to the attachment device and respectively positioned on a first side and a second side of a rotation axis of a front end of the automated machine to which the attachment device is fixed.

7. The laser processing system according to claim 6, further comprising:
    first control circuitry configured to stop irradiation of the laser beam by the irradiation device when at least one of the pair of limit switches detects the disengagement.

8. The laser processing system according to claim 1, wherein the irradiation device further includes a water channel positioned inside the housing and through which cooling water flows, and a first temperature sensor positioned inside the housing and configured to detect a temperature of the cooling water flowing through the water channel.

9. The laser processing system according to claim 8, wherein the first temperature sensor is positioned in the water channel near an inflow port configured to permit the cooling water, supplied from outside of the housing, to flow into inside of the housing.

10. The laser processing system according to claim 8, further comprising:
    first control circuitry configured to determine whether or not a detected temperature of the first temperature sensor of the irradiation device is within a predetermined temperature range, and stop irradiation of the laser beam by the irradiation device when the detected temperature is outside the predetermined temperature range.

11. The laser processing system according to claim 1, wherein the irradiation device further includes a first mirror configured to reflect the laser beam, a first mirror holder configured to hold the first mirror, a second mirror configured to further reflect the laser beam reflected by the first mirror, a second mirror holder configured to hold the second mirror, and at least one second temperature sensor positioned adjacent at least one of the first mirror holder and the second mirror holder and configured to detect a temperature adjacent to at least one of the first mirror holder and the second mirror holder.

12. The laser processing system according to claim 11, further comprising:
first control device circuitry configured to determine whether or not a detected temperature of the at least one second temperature sensor of the irradiation device is equal to or higher than a predetermined temperature, and stop irradiation of the laser beam by the irradiation device when the detected temperature is equal to or higher than the predetermined temperature.

13. The laser processing system according to claim 1, further comprising:
first control circuitry configured to control the irradiation device;
an automatic machine to which the irradiation device is attached; and
second control circuitry configured to control the automatic machine.

14. The laser processing system according to claim 13, further comprising:
a laser oscillator configured to oscillate the laser beam to the irradiation device,
wherein the first control circuitry is further configured to cause, via the second control circuitry, the laser oscillator to stop oscillation of the laser beam when an abnormality has occurred in the irradiation device.

15. A laser processing method for processing a workpiece, comprising:
irradiating a laser beam to workpiece by an irradiation device including a housing, a box positioned inside the housing and housing at least a part of a path of the laser beam, at least one infrared sensor positioned inside the housing and around the box, the at least one infrared sensor being positioned to directly detect first infrared light from a mirror reflecting the laser beam without an element therebetween;
determining whether or not the at least one infrared sensor of the irradiation device has detected the first infrared light of a specific wavelength; and
stopping the irradiation of the laser beam by the irradiation device when it is determined that the first infrared light has been detected.

16. The laser processing method according to claim 15, further comprising:
determining whether or not a detected temperature of a first temperature sensor is within a predetermined temperature range; and
stopping irradiation of the laser beam by the irradiation device when the detected temperature is outside the predetermined temperature range.

17. The laser processing method according to claim 16, further comprising:
determining whether or not a detected temperature of at least one second temperature sensor is equal to or higher than a predetermined temperature, and
stopping irradiation of the laser beam by the irradiation device when the detected temperature is equal to or higher than the predetermined temperature.

18. The laser processing method according to claim 17, wherein the first temperature sensor is positioned inside the housing and the second temperature sensor is positioned adjacent a mirror included in the housing.

19. A non-transitory computer readable medium having stored thereon a program that when executed by a computer causes the computer to implement a laser processing method for processing a workpiece, the laser processing method comprising:
irradiating a laser beam to workpiece by an irradiation device including a housing, a box positioned inside the housing and housing at least a part of a path of the laser beam, and at least one infrared sensor positioned inside the housing and around the box, the at least one infrared sensor being positioned to directly detect first infrared light from a mirror reflecting the laser beam without an element therebetween;
determining whether or not the at least one infrared sensor has detected the first infrared light of a specific wavelength; and
stopping the irradiation of the laser beam when it is determined that the first infrared light has been detected.

20. The laser processing system according to claim 1, wherein the first infrared light of the specific wavelength is detected from a wall of the housing.

* * * * *